United States Patent [19]
Murakami et al.

[11] Patent Number: 5,881,033
[45] Date of Patent: Mar. 9, 1999

[54] OBJECTIVE LENS ACTUATOR HAVING A HIGH DEGREE OF DESIGN FREEDOM

[75] Inventors: Yutaka Murakami, Hirakata; Hironori Tomita, Katano, both of Japan

[73] Assignee: Matsushita Electric Industrial Co., Ltd., Osaka-fu, Japan

[21] Appl. No.: 791,848

[22] Filed: Jan. 30, 1997

[30] Foreign Application Priority Data

Jan. 31, 1996 [JP] Japan .................................. 8-014952

[51] Int. Cl.⁶ .................................................. G11B 7/09
[52] U.S. Cl. .................................. 369/44.14; 369/44.22; 359/814; 359/824
[58] Field of Search ............................ 369/44.14, 44.15, 369/44.16, 44.21, 44.22; 359/813, 814, 824, 823

[56] References Cited

U.S. PATENT DOCUMENTS

| | | |
|---|---|---|
| 4,987,565 | 1/1991 | Ikegame . |
| 5,068,844 | 11/1991 | Tanaka . |
| 5,073,882 | 12/1991 | Sasaki . |
| 5,222,056 | 6/1993 | Tanaka .................................. 369/44.15 |
| 5,285,434 | 2/1994 | Kim et al. . |
| 5,428,481 | 6/1995 | Ikegame et al. ...................... 369/44.15 |
| 5,579,295 | 11/1996 | Van Rosmalen ...................... 369/44.16 |
| 5,663,840 | 9/1997 | Matsui .................................. 369/44.15 |

FOREIGN PATENT DOCUMENTS

| | | |
|---|---|---|
| 602 720 | 6/1994 | European Pat. Off. . |
| 0258346 | 11/1986 | Japan . |
| 406162540 A | 6/1994 | Japan . |
| 7-240031 | 9/1995 | Japan . |

*Primary Examiner*—Thang V. Tran
*Attorney, Agent, or Firm*—Wenderoth, Lind & Ponack, L.L.P.

[57] ABSTRACT

A structure has a focus coil wound or affixed on sides of a lens holder holding an objective lens and two or more permanent magnets spaced from each other and facing the focus coil with their magnetic poles directed in the same direction with respect to one side of the focus coil, wherein the density distribution of the magnetic flux passing through the side of the focus coil facing the permanent magnets has two or more maximum points. This allows for a large assembly error, or tolerance, and reduces inclination of the optical axis in an objective lens actuator used in the optical pickup of various kinds of optical disk devices.

26 Claims, 26 Drawing Sheets

FLOW OF MAGNETIC FLUX

FLOW OF MAGNETIC FLUX

OBJECTIVE LENS ACTUATOR HAVING A HIGH DEGREE OF DESIGN FREEDOM

BACKGROUND OF THE INVENTION

1. Field of the Invention

The present invention relates to objective lens actuators, and more particularly to an objective lens actuator installed in the optical pickup used in the optical disk recording and/or reproducing device (hereinafter referred to as an optical disk device,) such as the minidisk (referred to as MD) player, the compact disk (referred to as CD) player, the digital video disk (referred to as DVD) player, etc., for displacing the objective lens to adjust the position of irradiation of light beam.

2. Description of the Background Art

As is well known, optical disk devices optically record and reproduce information to and from a disk-like information recording medium (hereinafter referred to as an optical disk) such as MD, CD, DVD, etc. while driving the objective lens along the two axes in the Z axis direction corresponding to the vertical optical axis direction as seen from the side of the optical disk (hereinafter also referred to as a focus direction) and in the X axis direction corresponding to the parallel radial direction as seen from the side of the optical disk (hereinafter also referred to as a tracking direction) to correct the focus error caused by up-and-down movement due to a warp of the optical disk and the tracking error caused by its eccentricity.

FIG. 22 is a diagram roughly showing the structure of an optical pickup installed in the optical disk device. The optical pickup is now be described briefly.

In FIG. 22, the light beam emitted from a semiconductor laser 111 is transmitted through a beam splitter 222 to enter an objective lens 1 provided in a lens holder 2. The objective lens 1 collects the laser light to form a small beam spot of about 1 μm on the recording surface of an optical disk E. An objective lens actuator 555 is provided, being related to the lens holder 2. This objective lens actuator 555, which is formed of an electromagnetic circuit, is capable of driving the objective lens 1 in the focus direction and in the tracking direction. Provision of such an objective lens actuator 555 enables follow-up control of the objective lens 1 to the recording track with a precision of submicrons against movement of the surface or eccentricity of the optical disk E.

The light beam reflected at the recording surface of the optical disk E returns through the objective lens 1 and is reflected at the beam splitter 222 in the normal direction. Then the PIN photodiode 666 detects the intensity of the beam to enable reading of the information pits of the optical disk E and detection of the focus error signal and the tracking error signal.

Recently, optical disk recording/reproducing devices with higher density are being developed. To increase the resolution for high-density recording/reproducing, objective lenses with larger numerical aperture (hereinafter referred to as NA) are used. When the optical axis of the beam is inclined with respect to the recording/reproducing surface of the optical disk, however, the degree of coma increases in proportion to the third power of the NA. Therefore, with an objective lens having a large NA, if the optical axis is inclined while the objective lens is being moved in the focus direction or in the tracking direction in the objective lens actuator, it will exert an ill effect on the recording/reproducing of signal on the optical disk.

Conventionally, an objective lens actuator which solves the problem mentioned above is disclosed in Japanese Patent Laying-Open No.7-240031. The conventional objective lens actuator will now be described referring to FIG. 23 to FIG. 26.

FIG. 23 is a perspective view showing the structure of the conventional objective lens actuator. FIG. 24 is a cross-sectional view showing a main part of the objective lens actuator moving the objective lens in the focus direction (Z axis direction) and the tracking direction (X axis direction). FIG. 25 is a side view of the main part of the objective lens actuator moving the objective lens in the focus direction and the tracking direction. FIG. 26 is a top view of the main part of the electromagnetic circuit in the objective lens actuator in the case where a positional error occurs in the X axis direction.

In FIG. 23 to FIG. 26, the conventional objective lens actuator includes a lens holder 2, a focus coil 3, tracking coils 4, permanent magnets 5, a yoke base 6, back yokes 6a, opposing yokes 6b, elastic supporting members 7, a supporting member fixing portion 8, a supporting member fixing substrate 9, and printed boards 10.

The lens holder 2, which is formed of a resin molded article, holds the objective lens 1 fixed by adhesion or the like. The elastic supporting members 7, which are formed of a metal line having spring property, hold the lens holder 2, with their respective ends on one side solder-fixed to the printed boards 10. The back yokes 6a and the opposing yokes 6b form a magnetic circuit with the permanent magnets 5. The ends of the opposing yokes 6b on the side closer to the optical disk E are disposed closer to the optical disk E than the ends of the permanent magnets 5 on the side closer to the optical disk E. This forms a flow of magnetic flux in the focus direction in the part close to the optical disk E in the gap between the permanent magnets 5 and the opposing yokes 6b. The focus coil 3 and the tracking coils 4 are wound around the sides of the lens holder 2. The supporting member fixing portion 8 fixes the supporting member fixing substrate 9. The other ends of the elastic supporting members 7 are solder-fixed to the supporting member fixing substrate 9. The yoke base 6 is fixed on an optical substrate (not shown) supporting the semiconductor laser 111, the beam splitter 222, and the photodetector 666 in FIG. 22.

Next, the operation of driving the objective lens 1 along the two axes in the focus direction and the tracking direction to correct a focus error caused by the up-and-down movement due to a warp of the optical disk E and a tracking error cased by eccentricity or the like will be described.

The lens holder 2 to which the objective lens 1 is attached is supported in such a way that it can be moved in the focus direction and the tracking direction by the four elastic supporting members 7 disposed in parallel to each other (each of which has its one end fixed to the lens holder 2 through the printed board 10 and the other end fixed to the supporting member fixing substrate 9.) The supporting member fixing substrate 9 is fixed to the supporting member fixing portion 8 fixed to the yoke base 6.

A driving force in the focus direction is generated by the electromagnetic driving circuit in which the focus coil 3 is disposed in the gap in the magnetic circuit composed of the permanent magnets 5, the back yokes 6a and the opposing yokes 6b attached to the yoke base 6. The driving force generated in the focus direction causes the lens holder 2 to translate in the focus direction through the elastic supporting members 7.

A driving force in the tracking direction is generated by the electromagnetic driving circuit in which the tracking coils 4 are disposed in the gap in the magnetic circuit formed of the permanent magnets 5, the back yokes 6a and the opposing yokes 6b attached to the yoke base 6. The driving force generated in the tracking direction translates the lens holder 2 in the tracking direction through the elastic supporting members 7.

Next, the mechanism for suppressing torque around the Y axis which is a cause of inclination of the optical axis will be described referring to FIG. 24 to FIG. 26.

As shown in FIG. 24, displacement of the movable part composed of the objective lens 1, the lens holder 2, the focus coil 3, the tracking coils 4 and the printed boards 10 by dt in the X axis plus direction in the tracking direction causes the center of gravity, G, of the movable part to differ by the same displacement, dt, from the center of generation, Fc, of the focus driving force. Then the focus driving force Ff0 in the direction toward the optical disk E caused by the focus driving current If produces clockwise torque about the Y axis at the center of gravity, G, of the movable part.

On the other hand, as shown in FIG. 25, while the driving force Ft0 is produced in the tracking direction toward the X axis plus direction by the tracking driving current It in the sides of the tracking coils 4 that are parallel to the Z axis, driving forces Ft1 and Ft2 are produced in the opposite direction to the tracking driving force Ft0 in the sides of the tracking coils 4 that are parallel to the Y axis, for the magnetic flux passes therethrough in the focus direction. When the movable part is moved in the direction toward the optical disk E by the focus driving force Ff0, a difference occurs between the driving forces Ft1 and Ft2, which produces torque counterclockwise about the Y axis at the center of gravity, G, of the movable part.

That is to say, the torque around the Y axis produced by the focus coil 3 and the torque around the Y axis produced by the tracking coils 4 act in such directions as to cancel out, which suppresses inclination of the optical axis to allow the objective lens 1 to translate in the focus direction and in the tracking direction.

However, the conventional structure requires adjustment so that the torque around the Y axis generated by the focus coil 3 and the torque around the Y axis generated by the tracking coils 4 can accurately cancel each other, thus causing the problem that a large allowable error (hereinafter referred to as tolerance) can not be set for positional deviation of the magnets and positional deviation of the lens holder due to assembly error.

Furthermore, it requires that the focus coil and the tracking coils should be disposed in the same movable part. Therefore, in a separate type objective lens actuator in which the electromagnetic circuit, the movable part, and the supporting members for driving in the focus direction and the electromagnetic circuit, the movable part, and the supporting members for driving in the tracking direction are independently constructed, the torque due to the focus driving force can not be cancelled by the tracking coils, resulting in the problem that the optical axis of the objective lens may be inclined.

SUMMARY OF THE INVENTION

An object of the present invention is to provide an objective lens actuator with decreased inclination of the optical axis of the objective lens, large tolerance, and a high degree of design freedom.

The present invention has the following features to achieve the object above.

A first aspect of the present invention relates to a device for driving an objective lens for collecting coherent light onto information track on an information recording medium at least in a focus direction perpendicular to the information recording medium, which includes:

a lens holder holding the objective lens;

a focus coil wound or affixed on sides of the lens holder;

a plurality of magnetic flux generating portions disposed to face the focus coil; and an elastic supporting portion supporting the lens holder so that the lens holder can move at least in the focus direction;

wherein each of the magnetic flux generating portion generates magnetic flux such that the density distribution of the magnetic flux passing through an opposing side of the focus coil has two or more maximum points.

According to the first aspect mentioned above, the formation of the two or more maximum points in the distribution of the magnetic flux density passing through one side of the focus coil causes the density distribution of the magnetic flux passing through one side of the focus coil to be flatter than in a conventional device having only one maximum point. Accordingly, torque around the Y axis generated in the focus coil does not become so large even with some positional error between the magnetic circuit and the focus coil. This allows the permissible positional error, or the tolerance, between the magnetic circuit and the focus coil to be set large, providing an objective lens actuator with a high degree of design freedom. Furthermore, since the torque around the Y axis can be suppressed with the focus coil alone, it is not necessary to cancel the torque around the Y axis with a tracking coil. Accordingly, the torque around the Y axis does not become large even with the actuator for focus driving and the actuator for tracking driving independently constructed.

According to a second aspect, in the first aspect, each of the magnetic flux generating portions generates the magnetic flux so that the area of the density distribution of the magnetic flux passing through the opposing side of the focus coil is wider than the length of the side of the focus coil.

According to the second aspect mentioned above, the density distribution of the magnetic flux passing through one side of the focus coil is made further flatter, further reducing the torque around the Y axis.

According to a third aspect, in the second aspect, each of the magnetic flux generating portions includes a plurality of permanent magnets having their magnetic poles directed in the same direction with respect to the opposing side of the focus coil and spaced apart from each other in the direction parallel to the opposing side of the focus coil.

According to a fourth aspect, in the third aspect, each of the magnetic flux generating portions includes two permanent magnets as the plurality of permanent magnets, wherein the length Fp of the opposing side of the focus coil and the mounting pitch P of the two permanent magnets have the relation given by the expression (a) below $$P = Fp \qquad (a).$$

According to a fifth aspect, in the third aspect, each of the magnetic flux generating portions further includes, an opposing yoke disposed to face the plurality of permanent magnets with the focus coil interposed therebetween, and a back yoke disposed to abut on the sides of the plurality of permanent magnets that are opposite to their sides facing the focus coil, wherein the plurality of permanent magnets, the opposing yoke, and the back yoke form a magnetic circuit together.

According to a sixth aspect, in the fifth aspect, each of the magnetic flux generating portions includes two permanent magnets as the plurality of permanent magnets, and the back yoke has a central projection formed in the center to extend in the focus direction for positioning the two permanent magnets.

According to the sixth aspect above, a pair of permanent magnets can be easily and stably positioned, leading to improvement of quality.

According to a seventh aspect, in the fifth aspect, each of the magnetic flux generating portions includes two permanent magnets as the plurality of permanent magnets, and the back yoke has two outside projections formed at its marginal parts on both sides to extend in the focus direction for positioning the two permanent magnets.

According to the seventh aspect above, two permanent magnets in a pair can be attached at a small pitch, leading to down-sizing of the objective lens actuator.

According to an eighth aspect, in the second aspect, each of the magnetic flux generating portions includes, a plurality of divided yokes disposed to face the focus coil and spaced apart in the direction parallel to the opposing side of the focus coil, and a single permanent magnet disposed to abut on the sides of the divided yokes that are opposite to the sides facing the focus coil.

According to the eighth aspect above, a single permanent magnet can be disposed in one magnetic flux generating portion, enabling price reduction with a reduced number of parts.

According to a ninth aspect, in the eighth aspect, each of the magnetic flux generating portions includes two divided yokes as the plurality of divided yokes, wherein each width Wc and each provision pitch Pc of the two divided yokes have the relation given by the expression (b) below $$Pc-Wc>0 \qquad (b).$$

According to a tenth aspect, in the second aspect, each of the magnetic flux generating portions includes, an intermediate yoke facing the focus coil and having a plurality of projections spaced in the direction parallel to the opposing side of the focus coil, a single permanent magnet disposed to abut on the side of the intermediate yoke which is opposite to the side facing the focus coil, and a back yoke provided to sandwich the permanent magnet with the intermediate yoke.

According to the tenth aspect above, the efficiency of use of the magnetic flux increases, enabling improvement of the driving sensitivity and size reduction of the permanent magnet, which leads to reduction of size and reduction of power dissipation of the objective lens actuator.

According to an eleventh aspect, in the tenth aspect, the intermediate yoke has two projections as the plurality of projections, wherein each width Wb and each pitch Pb of the two projections of the intermediate yoke have the relation given by the expression (c) below $$Pb-Wb>0 \qquad (c).$$

According to a twelfth aspect, in the second aspect, a ferromagnetic piece is integrally formed on a side of the lens holder which is perpendicular to its side facing the magnetic flux generating portion.

According to the twelfth aspect above, the density distribution of the magnetic flux passing through one side of the focus coil is made flatter even with a single permanent magnet provided in each magnetic flux generating portion, which suppresses the torque around the Y axis generated in the focus coil. This allows the width of the permanent magnet in the X axis direction to be reduced, which in turn allows the width of the objective lens actuator in the X axis direction to be reduced. Then a motor with a larger diameter can be used to rotate the optical disk.

According to a thirteenth aspect, in the twelfth aspect, the ferromagnetic piece is composed of a material having electric conductivity and a current is supplied to the focus coil through the ferromagnetic piece.

According to the thirteenth aspect above, the ferromagnetic piece is also used to supply current to the focus coil and the tracking coil, eliminating the necessity of separately providing a printed board for current supply, which enables cost reduction with a reduced number of parts.

According to a fourteenth aspect, in the thirteenth aspect, the elastic supporting portion is integrally formed with the ferromagnetic piece.

According to the fourteenth aspect above, it is possible to form the elastic supporting portion and the ferromagnetic piece with a single member, which reduces the number of parts, leading to cost reduction.

A fifteenth aspect relates to a device for driving an objective lens collecting coherent light to information track on an information recording medium in a focus direction perpendicular to the information recording medium and a tracking direction parallel to the information recording medium and perpendicular to the information track, which includes:

a lens holder holding the objective lens;

a focus coil wound or affixed on sides of the lens holder;

a tracking coil wound or affixed on sides of the lens holder;

two magnetic flux generating portions disposed to face the focus coil and the tracking coil in a direction parallel to the information track; and an elastic supporting portion supporting the lens holder so that the lens holder can move in the focus direction and the tracking direction;

wherein each of the magnetic flux generating portions generates magnetic flux such that the density distribution of the magnetic flux passing through an opposing side of the focus coil has two or more maximum points.

According to the fifteenth aspect above, the formation of the two or more maximum points in the distribution of the magnetic flux density passing through one side of the focus coil causes the density distribution of the magnetic flux passing through one side of the focus coil to be flatter than in a conventional device having only one maximum point.

Accordingly, torque around the Y axis generated in the focus coil does not become so large even with some positional error between the magnetic circuit and the focus coil. This allows the permissible positional error, or the tolerance, between the magnetic circuit and the focus coil to be set large, providing an objective lens actuator with a high degree of freedom in design.

According to a sixteenth aspect, in the fifteenth aspect, each of the magnetic flux generating portions generates the magnetic flux such that the density distribution area of the magnetic flux passing through the opposing side of the focus coil is wider than the length of the side of the focus coil.

According to the sixteenth aspect above, the density distribution of the magnetic flux passing through one side of the focus coil is made further flatter, further reducing the torque around the Y axis.

According to a seventeenth aspect, in the sixteenth aspect, each of the magnetic flux generating portions includes a plurality of permanent magnets having their magnetic poles directed in the same direction with respect to the opposing side of the focus coil and spaced apart in the tracking direction.

According to an eighteenth aspect, in the seventeenth aspect, the tracking coil includes a first tracking coil wound or affixed on one side in the tracking direction of the lens holder around an axis parallel to the tracking direction and a second tracking coil wound or affixed on the other side in the tracking direction of the lens holder around an axis parallel to the tracking direction, and each of the magnetic flux generating portions includes two permanent magnets as the plurality of permanent magnets, wherein the mounting pitch Tp and the winding width Tw of the first and second tracking coils in the tracking direction, the movable range Td in the tracking direction of the lens holder, and each mounting pitch P and each width W of the two permanent magnets in the tracking direction have the relation given by the expression (d) and/or the expression (e) below $$Tp+Tw+Td \leq P+W \qquad (d)$$

$$Tp-Tw-Td \geq P-W \qquad (e).$$

According to the eighteenth aspect above, even when the lens holder moves for the movable range Td in the tracking direction, one side of the tracking coil does not protrude without and/or within the permanent magnets. That is to say, when the relation of the expression (d) and/or the expression (e) is satisfied, the driving force generated in the tracking coil does not rapidly decrease in the movable range Td in the tracking direction. This provides large tracking driving sensitivity and decreased power dissipation even with a structure in which the focus driving and the tracking driving are formed with a common magnetic circuit.

According to a nineteenth aspect, in the seventeenth aspect, each of the magnetic flux generating portions includes first and second permanent magnets as the plurality of permanent magnets, the tracking coil includes a first tracking coil wound or affixed on one side in the direction parallel to the information track of the lens holder and a second tracking coil wound or affixed on the other side in the direction parallel to the information track of the lens holder, each of the tracking coil including first and second windings wound into coils around axes in the direction parallel to the information track and connected to each other, the first and second windings being disposed symmetrically in the lateral direction to face the first and second permanent magnets, respectively, wherein the mounting pitch Tp and the winding width Tw between opposing sides of the first and second windings whose winding directions are parallel to the focus direction, the movable range Td in the tracking direction of the lens holder, and the mounting pitch P and the width W of the first and second permanent magnets in the tracking direction have the relation given by the expression (f) and/or the expression (g) below $$Tp+Tw+Td \leq P+W \qquad (f)$$

$$Tp-Tw-Td \geq P-W \qquad (g).$$

According to the nineteenth aspect above, it is possible to freely set winding cores of the tracking coils to reduce unnecessary length of the windings of the tracking coils, providing lower resistance.

According to a twentieth aspect, in the nineteenth aspect, the first and second tracking coils are each formed on a printed board, the printed board being affixed on a side of the lens holder.

According to the twentieth aspect above, the first and the second tracking coil are each formed on a printed board in advance and then affixed on a side of the lens holder. This simplifies the process of forming the tracking coil, as compared with the case in which the tracking coils are wound directly on the sides of the lens holder, leading to reduction of manufacturing cost and reduction of assembly time.

According to a twenty-first aspect, in the seventeenth aspect, each of the magnetic flux generating portions further includes, an opposing yoke disposed to face the plurality of permanent magnets with the focus coil interposed therebetween, and a back yoke disposed to abut on the sides of the plurality of permanent magnets that are opposite to their sides facing the focus coil, wherein the plurality of permanent magnets, the opposing yoke, and the back yoke form a magnetic circuit together.

According to a twenty-second aspect, in the twenty-first aspect, each of the magnetic flux generating portions further includes a cover yoke formed of a ferromagnetic material and disposed in parallel with the information recording medium across the end faces of the opposing yoke and the back yoke that are closer to the information recording medium.

According to the twenty-second aspect above, the cover yoke provided across the respective top ends of the opposing yoke and the back yoke causes the magnetic resistance in the Z axis direction to be symmetrical about the permanent magnets and then uniform magnetic flux passes through two sides of the tracking coil that are parallel to the Y axis. This results in reduction of the torque generated around the Y axis by the tracking coil.

According to a twenty-third aspect, in the twenty second aspect, the tracking coil includes a first tracking coil wound or affixed on one side in the tracking direction of the lens holder around an axis parallel to the tracking direction and a second tracking coil wound or affixed on the other side in the tracking direction of the lens holder around an axis parallel to the tracking direction, wherein the mounting pitch Tp and the winding width Tw of the first and second tracking coils in the tracking direction, the movable range Td in the tracking direction of the lens holder, and the width Wy in the tracking direction of the cover yoke have the relation given by the expression (h) below $$Wy \geq Tp+Tw+Td \qquad (h).$$

According to the twenty-third aspect above, when the expression (h) above is satisfied, almost no torque is generated around the Y axis by the tracking coil in the tracking movable range Td.

According to a twenty-fourth aspect, in the seventeenth aspect, each of the magnetic flux generating portions includes two permanent magnets as the plurality of permanent magnets, and the back yoke has a central projection formed in the center to extend in the focus direction for positioning the two permanent magnets.

According to the twenty-fourth aspect above, a pair of permanent magnets can be easily and stably positioned, thus providing improved quality.

According to a twenty-fifth aspect, in the seventeenth aspect, each of the magnetic flux generating portions includes two permanent magnets as the plurality of permanent magnets, and the back yoke has outside projections formed in its marginal parts on both sides in the tracking direction to extend in the focus direction for positioning the two permanent magnets.

According to the twenty-fifth aspect above, two permanent magnets in a pair can be mounted at a small pitch, which results in size reduction of the objective lens actuator.

According to a twenty-sixth aspect, in the sixteenth aspect, each of the magnetic flux generating portions includes, a plurality of divided yokes facing the focus coil in the direction parallel to the information track and spaced apart in the tracking direction, and a single permanent magnet disposed to abut on the sides of the divided yokes that are opposite to their sides facing the focus coil.

According to the twenty-sixth aspect above, a single permanent magnet can be disposed in one magnetic flux generating portion and therefore the number of parts can be reduced to reduce the cost.

According to a twenty-seventh aspect, in the twenty-sixth aspect, each of the magnetic flux generating portions includes two divided yokes as the plurality of divided yokes, wherein each width Wc and each provision pitch Pc of the two divided yokes in the tracking direction have the relation given by the expression (i) below $$Pc-Wc>0 \qquad (i).$$

According to a twenty-eighth aspect, in the twenty-seventh aspect, the mounting pitch Tp and the winding width Tw of the tracking coil in the tracking direction, the movable range Td in the tracking direction of the lens holder, and the width Wc and the provision pitch Pc of the divided yokes in the tracking direction have the relation given by the expression (j) and/or the expression (k) below $$Tp+Tw+Td \leq Pc+Wc \qquad (j)$$

$$Tp-Tw-Td \geq Pc-Wc \qquad (k).$$

According to the twenty-eighth aspect above, even when the lens holder moves for the movable range Td in the tracking direction, one side of the tracking coil does not protrude beyond and/or within the divided yokes. That is to say, when the relation of the expression (j) and/or the expression (k) is satisfied, the driving force generated in the tracking coil does not rapidly decrease in the movable range Td in the tracking direction. This provides large tracking driving sensitivity and decreased power dissipation even with a structure in which the focus driving and the tracking driving are formed with a common magnetic circuit.

According to a twenty-ninth aspect, in the sixteenth-aspect, each of the magnetic flux generating portions includes, an intermediate yoke facing the focus coil in the direction parallel to the information track and having a plurality of projections formed at an interval in the tracking direction, a single permanent magnet disposed to abut on the side of the intermediate yoke that is opposite to the side facing the focus coil, and a back yoke provided to sandwich the permanent magnet with the intermediate yoke in the direction parallel to the information track.

According to the twenty-ninth aspect, the efficiency of use of the magnetic flux is improved, leading to improvement of the driving sensitivity and size reduction of the magnet, which enables size reduction and reduction of power consumption of the objective lens actuator.

According to a thirtieth aspect, in the twenty-ninth aspect, the intermediate yoke has two projections as the plurality of projections, wherein each width Wb and each pitch Pb of the two projections of the intermediate yoke in the tracking direction have the relation given by the expression (m) below $$Pb-Wb>0 \qquad (m).$$

According to a thirty-first aspect, in the thirtieth aspect, the mounting pitch Tp and the winding width Tw of the tracking coil in the tracking direction, the movable range Td in the tracking direction of the lens holder, and each width Wb and each pitch Pb of the two projections of the intermediate yoke have the relation given by the expression (n) and/or the expression (o) below $$Tp+Tw+Td \leq Pb+Wb \qquad (n)$$

$$Tp-Tw-Td \geq Pb-Wb \qquad (o).$$

According to the thirty-first aspect above, even when the lens holder moves for the movable range Td in the tracking direction, one side of the tracking coil does not protrude without and/or within the projections of the intermediate yoke. That is to say, when the relation of the expression (n) and/or the expression (o) is satisfied, the driving force generated in the tracking coil does not rapidly decrease in the movable range Td in the tracking direction. This provides large tracking driving sensitivity and decreased power dissipation even with a structure in which the focus driving and the tracking driving are formed with a common magnetic circuit.

According to a thirty-second aspect, in the sixteenth aspect, a ferromagnetic piece is integrally formed on a side in the tracking direction of the lens holder.

According to the thirty-second aspect above, the density distribution of the magnetic flux passing through one side of the focus coil is made flatter even with a single permanent magnet provided in each magnetic flux generating portion, which suppresses the torque around the Y axis generated in the focus coil. This allows the width of the permanent magnet in the X axis direction to be reduced, which in turn allows the width of the objective lens actuator in the X axis direction to be reduced. Then a motor with a larger diameter can be used to rotate the optical disk.

According to a thirty-third aspect, in the thirty-second aspect, the ferromagnetic piece is composed of a material having electric conductivity and a current is supplied to the focus coil and the tracking coil through the ferromagnetic piece.

According to the thirty-third aspect above, since the ferromagnetic piece is used also to supply current to the focus coil and the tracking coil, it is not necessary to separately provide a printed board for current supply, which reduces the number of parts and hence reduces the cost.

According to a thirty-fourth aspect, in the thirty-third aspect, the elastic supporting portion is integrally formed with the ferromagnetic piece.

According to the thirty-fourth aspect above, the elastic supporting portion and the ferromagnetic piece can be formed of a single member and therefore the number of parts can be reduced to reduce the cost.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
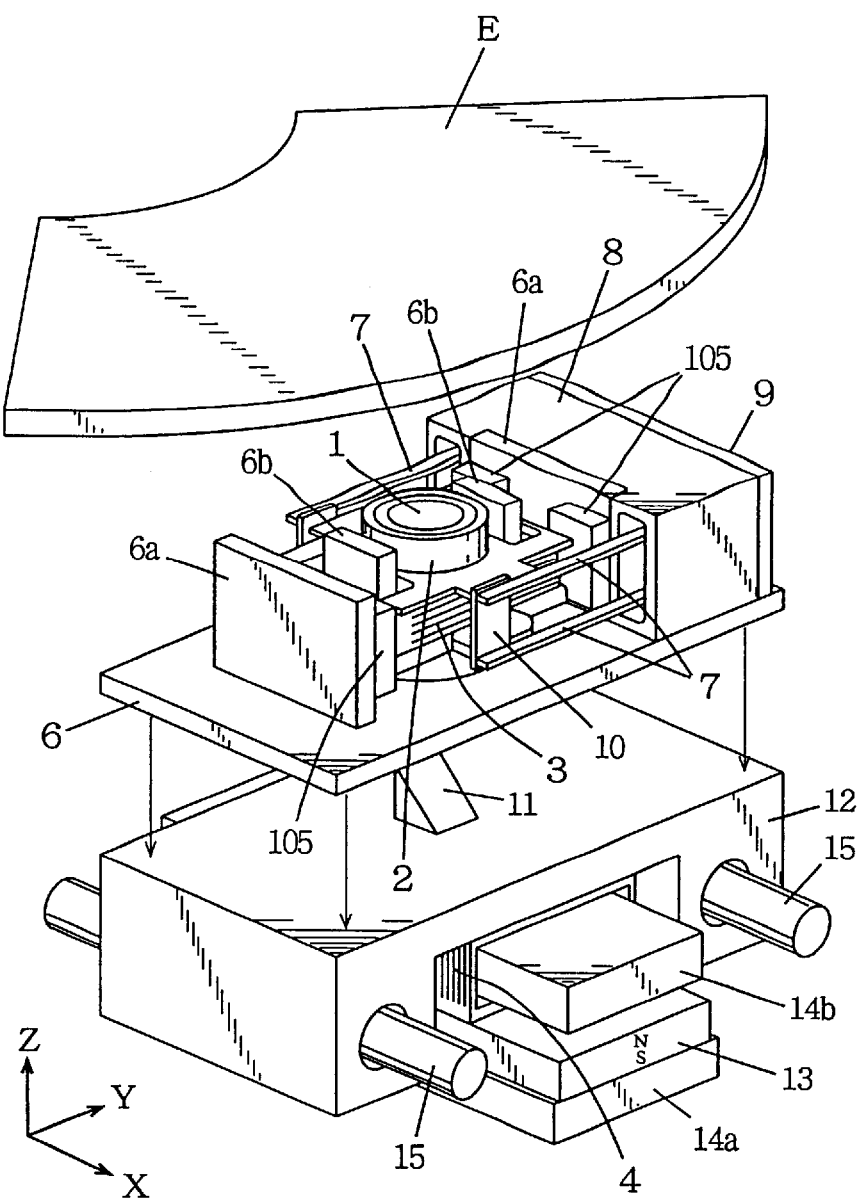
FIG. 1 is a perspective view showing the structure of an objective lens actuator according to a first embodiment of the present invention.
Figure 2:
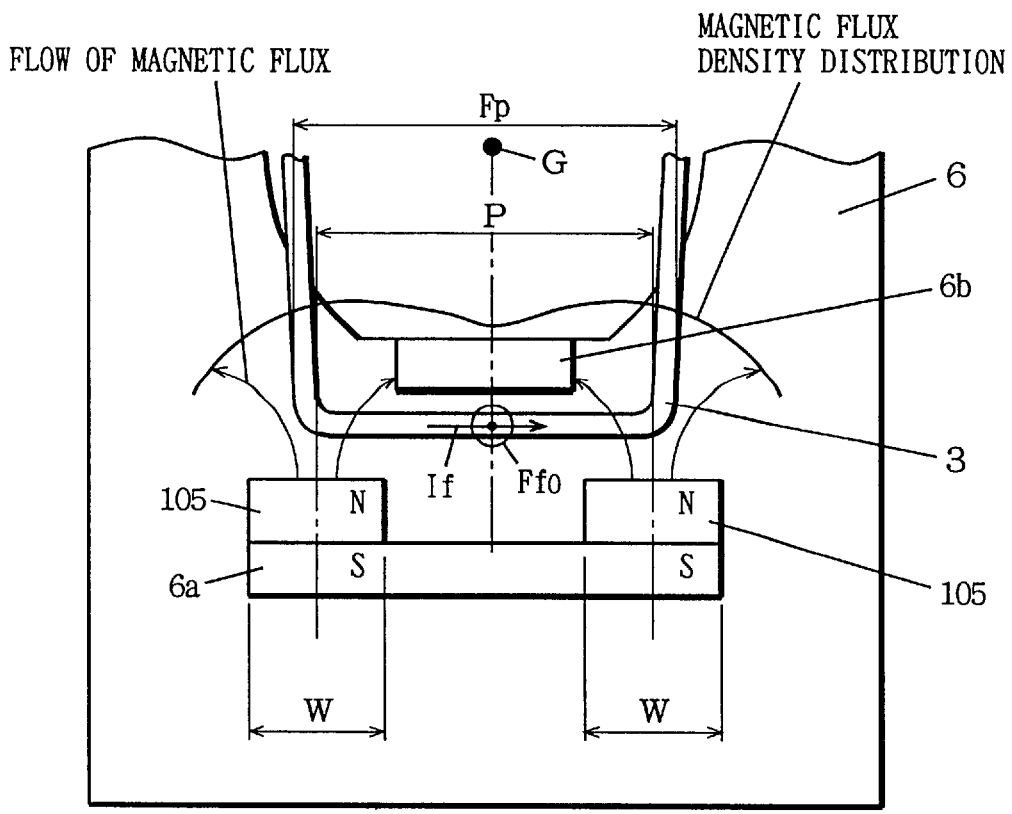
FIG. 2 is a top view of a main part of the electromagnetic circuit in the objective lens actuator of the first embodiment.
Figure 2:
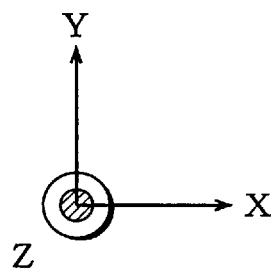
Figure 3A:
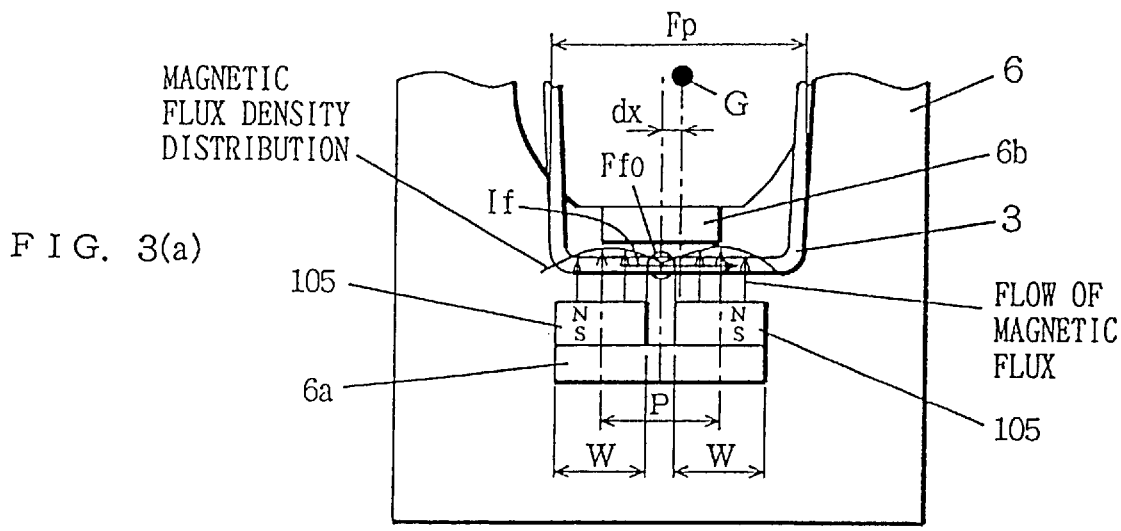
FIGS. 3(a) and 3(b) provides top views of the main part of the electromagnetic circuit in the case where a positional error occurs in the X-axis direction in the objective lens actuator of the first embodiment.
Figure 3B:
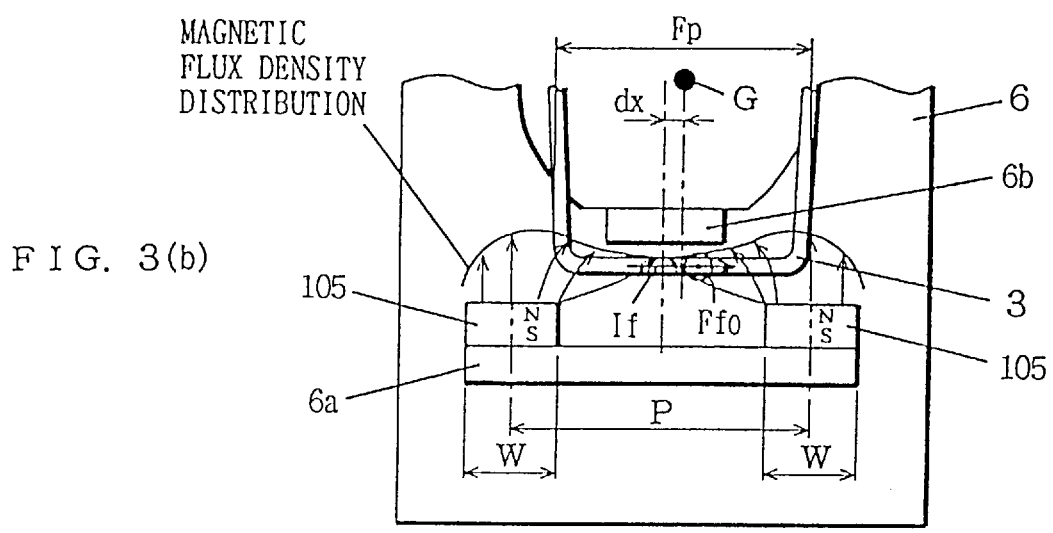
Figure 4:
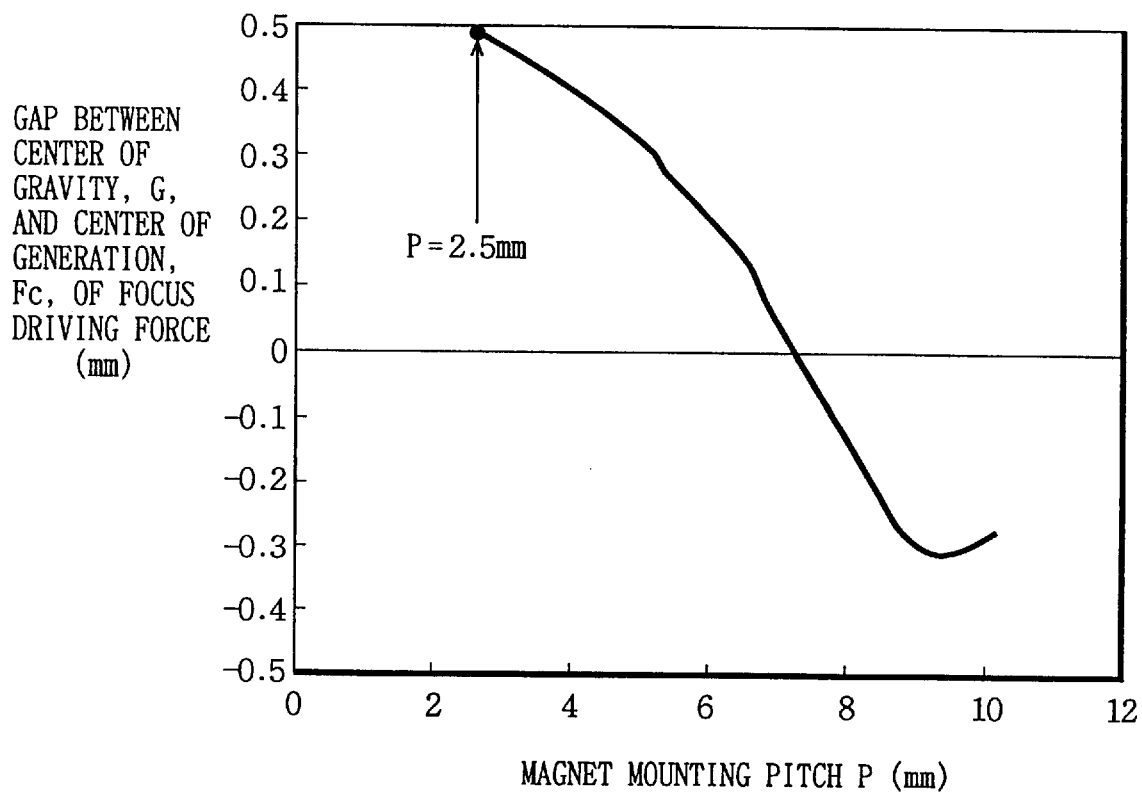
FIG. 4 is a diagram showing the results of simulation of the electromagnetic circuit of the objective lens actuator of the first embodiment.

FIG. 1 is a perspective view showing the structure of an objective lens actuator according to a first embodiment of the present invention. FIG. 2 is a top view of a main part of the electromagnetic circuit in the objective lens actuator. FIGS. 3(a) and 3(b) provides top views of the main part of the electromagnetic circuit when a positional error occurs in the X axis direction in the objective lens actuator. FIG. 4 is a diagram showing the results of simulation of the electromagnetic circuit of the objective lens actuator.

In FIG. 1 to FIGS. 3(a) and 3(b), the components having the same functions as those of the conventional example shown in FIG. 23 to FIG. 26 are shown at the same reference characters and not described in detail again.

In FIG. 1 to FIGS. 3(a) and 3(b), the objective lens 1 is fixed to the lens holder 2 formed of a resin molded article of liquid crystal polymer, PPS, etc. by adhesion or the like. The elastic supporting members 7, formed of a metal plate having the spring property (e.g., a sheet material of phosphor bronze) and each having its one end solder-fixed to a printed board 10, support the lens holder 2 in such a way that it can move in the Z axis direction, or the focus direction. The back yokes 6a and the opposing yokes 6b form a magnetic circuit with the permanent magnets 105. The focus coil 3 is wound around the Z axis on the sides of the lens holder 2. The supporting member fixing portion 8 fixes the supporting member fixing substrate 9. The other ends of the elastic supporting members 7 are solder-fixed to the supporting member fixing substrate 9.

Two of the permanent magnets 105 are disposed to face each of the two opposing sides of the focus coil 3 that are parallel to the X axis. The two permanent magnets 105 forming a pair (that is, the two permanent magnets facing the same side of the focus coil 3) are spaced from each other in the X axis direction with their magnetic poles directed in the same direction with respect to the focus coil 3. Accordingly, as shown in FIG. 2, the distribution of magnetic flux density through the focus coil 3 has two maximum points.

The yoke base 6 which forms a magnetic yoke integrally with the back yokes 6a and the opposing yokes 6b fixes the supporting member fixing portion 8 and is fixed to a traverse base 12. The tracking coil 4 is wound around the X axis and fixed to the traverse base 12. A traversing permanent magnet 13 is fixed on a traversing back yoke 14a to form a magnetic circuit with a traversing opposing yoke 14b. The guide shafts 15 are inserted in the holes formed in the sides of the traverse base 12 to pass therethrough in the X axis direction to guide the traverse base 12 in the X axis direction. A mirror 11 directs the light beam (not shown) emitted in the X axis direction from the semiconductor laser 111 shown in FIG. 22 located at the end of the X axis direction into the Z axis direction to cause it to enter the objective lens 1.

Next, the operation for driving the objective lens 1 along the two axes in the focus direction (Z axis direction) and the tracking direction (X axis direction) to correct the focus error caused by the up-and-down movement due to a warp of the optical disk E and the tracking error caused by eccentricity will be explained.

The driving force in the focus direction is produced by the electromagnetic driving circuit in which the focus coil 3 is disposed in the gap of the magnetic circuit composed of the permanent magnets 105, the back yokes 6a and the opposing yokes 6b mounted to the yoke base 6. The driving force generated in the focus direction causes the lens holder 2 to translate in the focus direction through the elastic supporting members 7.

The driving force in the tracking direction is produced by the electromagnetic driving circuit in which the tracking coil 4 is disposed in the gap of the magnetic circuit formed of the traversing permanent magnet 13, the traversing back yoke 14a and the traversing opposing yoke 14b. The driving force generated in the tracking direction translates the traverse base 12 along the guide shafts 15.

Next, the mechanism for suppressing torque around the Y axis in the first embodiment will be explained referring to FIG. 2 and FIG. 3.

FIG. 2 is a top view of a main part of the electromagnetic circuit in the case in which the center of gravity, G, of the movable part composed of the objective lens 1, the lens holder 2, the focus coil 3 and the printed boards 10 coincides with the center of the magnetic circuit. When a focus driving current If is applied to the focus coil 3, the driving force Ff0 is generated in the direction toward the optical disk E in the sides of the focus coil 3 which are parallel to the X axis. In this case, since the focus coil 3 is symmetrical about the magnetic circuit with respect to the Y axis, there is no divergence in the X axis direction between the center of generation of the driving force Ff0 and the center of gravity, G, of the movable part in the sides of the focus coil 3 which are parallel to the X axis, with no torque generated around the Y axis.

Next, the torque around the Y axis in the case where the center of gravity, G, of the movable part is shifted from the center axis of the magnetic circuit by dx will be explained considering the relation between the effective width Fp of the focus coil and the mounting pitch P of the permanent magnets 105.

First, as shown in FIG. 3(a), since a pair of permanent magnets 105 are disposed so that their respective same poles face one side of the focus coil 3 which extends along the X axis direction, the distribution of the magnetic flux density has two maximum points. Hence, as compared with the conventional example shown in FIG. 26, the flux density through the side parallel to the X axis in the focus coil 3 is distributed flatter and in a larger area. Accordingly, the center of generation of the driving force Ff0 generated in the focus coil 3 depends on the position of the focus coil 3 in the X axis direction, which reduces the positional gap in the X axis direction between the center of gravity, G, of the movable part and the driving center, Ff0, of the focus coil 3. This reduces the torque generated around the Y axis about the center of gravity, G, of the movable part.

As shown in FIG. 3(b), when the mounting pitch P of the permanent magnets 105 plus the width W in the X axis direction is larger than the length Fp in the X axis direction of the side of the focus coil 3 which faces the permanent magnets 105, that is, when the width in the X axis direction of the flux density distribution passing through the side in the X axis direction of the focus coil 3 is larger than the length of the side in the X axis direction of the focus coil 3, the side parallel to the X axis of the focus coil 3 faces the permanent magnet 105 on the X axis plus side in a larger area and hence the center of the generation of the driving force Ff0 in the focus direction moves in the same direction as the shift of the center of gravity, G, of the movable part. This further reduces the torque generated around the Y axis about the center of gravity, G, of the movable part.

The magnitude of the torque around the Y axis is determined by the product of the amount of shift, d, in the X axis direction between the center of generation, Fc, of the focus driving force and the center of gravity, G, of the movable part and the driving force generated in the focus coil 3. FIG. 4 shows the results of simulation of this relation. This shows the relation between the mounting pitch P of the permanent magnets 105 and the amount of shift, d, in the X axis direction between the center of generation, Fc, of the total focus driving force generated in the focus coil 3 and the center of gravity, G, of the movable part with an error of mounting position, dx, equal to 0.5 mm, existing in the X axis direction between the center of the magnetic circuit and the center of gravity, G, of the movable part, where the width W of the permanent magnet 105 was 2.5 mm and the width Fp of the focus coil 3 in the X axis direction was 7.2 mm.

In FIG. 4, the case in which the mounting pitch P of the permanent magnets 105 is 2.5 mm (the left end in the graph data) is equivalent to the structure of the conventional example where no interval is provided between the two permanent magnets 105 forming a pair. In this case, the amount of positional shift, d, in the X axis direction between the center of generation, Fc, of the focus driving force and the center of gravity, G, of the movable part is 0.5 mm, which is approximately equal to the mounting positional error dx of the movable part in the X axis direction. On the other hand, with a structure in which an interval is provided between the two permanent magnets 105 in a pair, the amount of positional shift, d, in the X axis direction between the center of generation, Fc, of the focus driving force and the center of gravity, G, of the movable part is clearly reduced as compared with that with no interval. When the mounting pitch P of the permanent magnets 105 is equal to the effective width Fp of the focus coil 3 (i.e., when P=Fp), the amount of shift, d, between the center of generation, Fc, of the focus driving force and the center of gravity, G, of the movable part is zero. As the mounting pitch P of the permanent magnets 105 becomes larger over the effective width Fp of the focus coil 3, the amount of positional shift d in the X axis direction between the center of generation Fc of the focus driving force and the center of gravity, G, of the movable part increases in the minus direction, but its absolute value is smaller than that with the pitch P of 2.5 mm.

As described above, the objective lens actuator according to the first embodiment, in which a pair of permanent magnets 105 spaced apart in the X axis direction are disposed to face a side of the focus coil 3 which is parallel to the X axis direction, can suppress the torque around the Y axis generated in the focus coil 3 only with the focus coil 3. This allows the allowable positional error, or the tolerance, between the magnetic circuit and the focus coil 3 to be set large.

(Second Embodiment)

Figure 5:
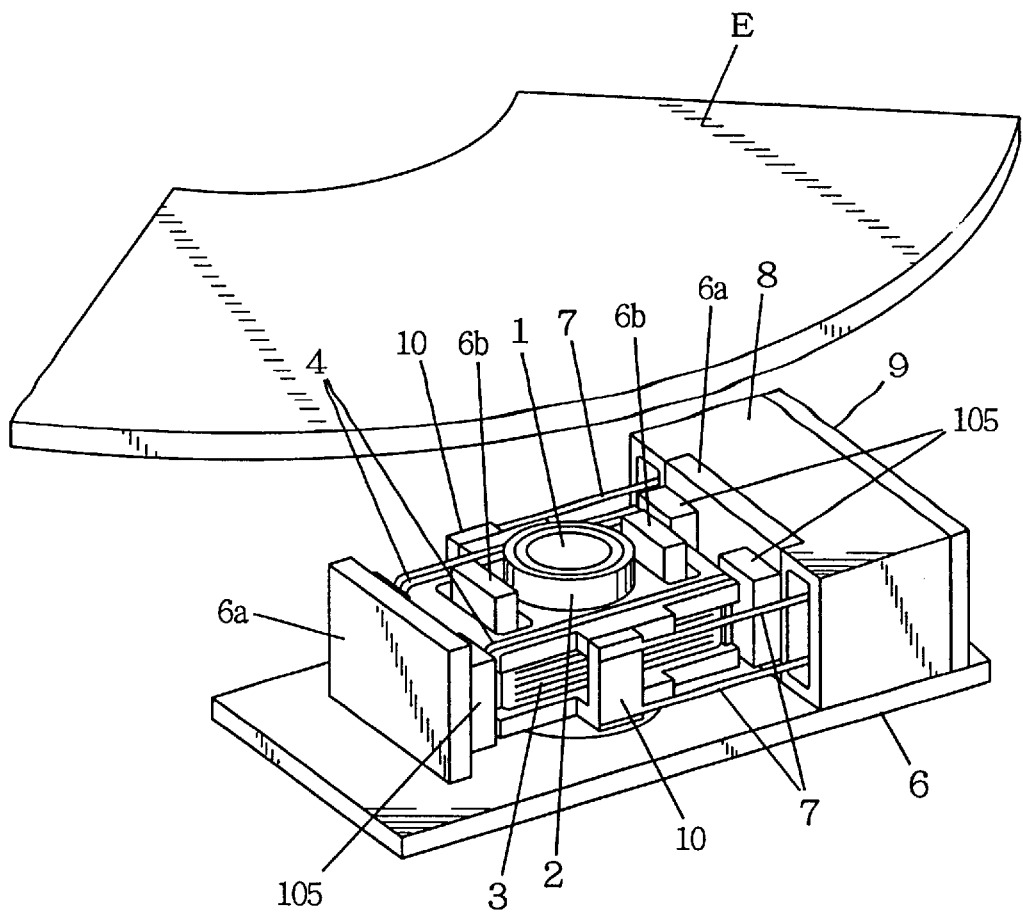
FIG. 5 is a perspective view showing the structure of an objective lens actuator according to a second embodiment of the present invention.
Figure 5:
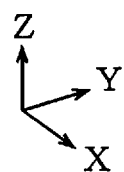
Figure 6:
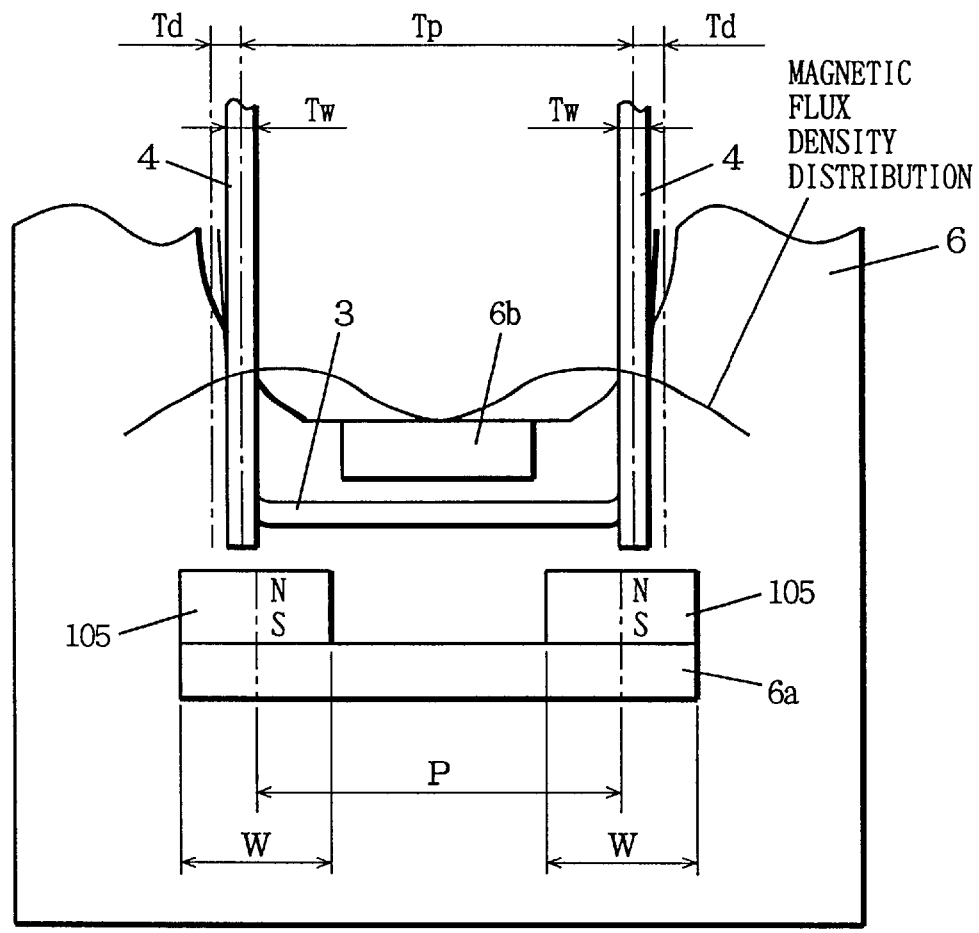
FIG. 6 is a top view of the main part of the objective lens actuator of the second embodiment.
Figure 7:
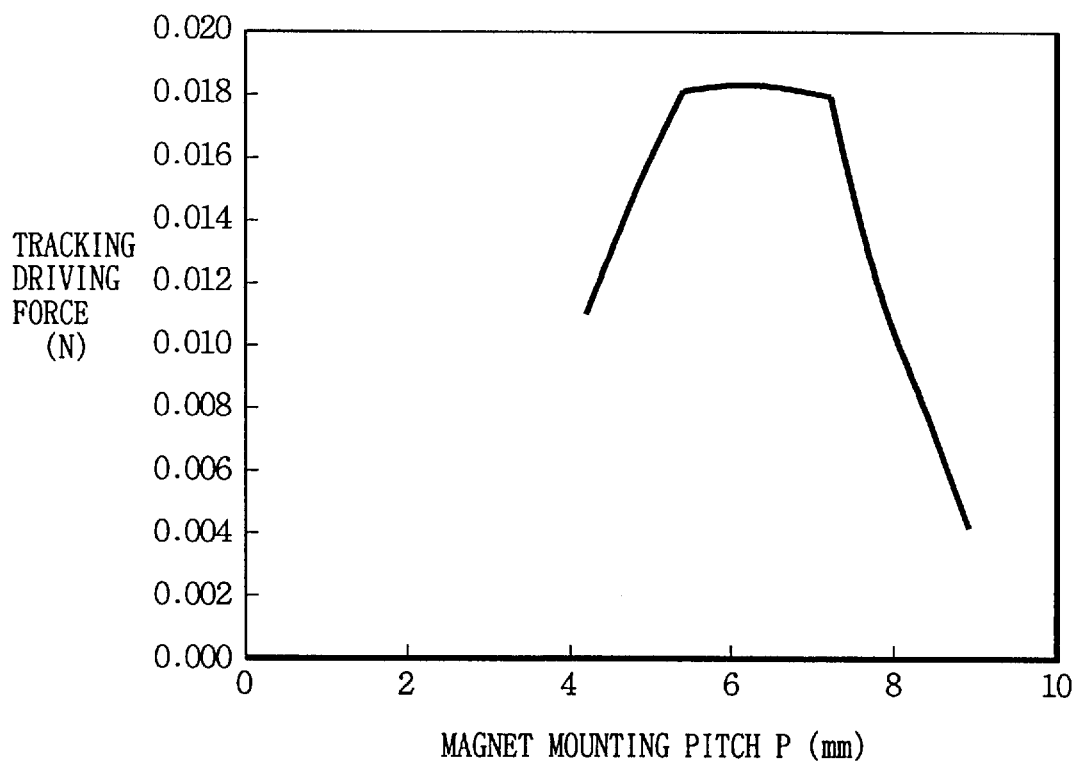
FIG. 7 is a diagram showing the results of simulation of the electromagnetic circuit in the objective lens actuator of the second embodiment.

FIG. 5 is a perspective view showing the structure of an objective lens actuator according to a second embodiment of the present invention. FIG. 6 is a top view of the main part of the objective lens actuator. FIG. 7 is a diagram showing the results of simulation of the electromagnetic circuit of the objective lens actuator. In FIG. 5 and FIG. 6, the components having the same functions as those in the conventional example depicted in FIG. 23 to FIG. 26 are shown at the same reference characters and not described in detail again.

Referring to FIG. 5 and FIG. 6, the objective lens 1 is fixed to the lens holder 2 formed of a resin molded article of liquid crystal polymer, PPS, etc. by means of adhesion or the like. The elastic supporting members 7, which are formed of a metal plate having a spring property (e.g., a sheet material of phosphor bronze,) has one end solder-fixed to the printed board 10 to support the lens holder 2 in such a way that it can move in the focus direction (Z axis direction) and the tracking direction (X axis direction.) The back yokes 6a and the opposing yokes 6b, forming a magnetic yoke with each other, form a magnetic circuit with the permanent magnets 105. The focus coil 3 is wound around the Z axis on the sides of the lens holder 2. The tracking coils 4 are wound around the X axis on the sides of the lens holder 2. The supporting member fixing portion 8 fixes the supporting member fixing substrate 9. The other ends of the elastic supporting members 7 are solder fixed to the supporting member fixing substrate 9.

Similarly to the first embodiment, each pair of the permanent magnets 105 are disposed facing each of the two sides of the focus coil 3 which are parallel to the X axis direction. Two of the permanent magnets 105 facing the same side of the focus coil 3 (i.e., two permanent magnets in a pair) are spaced from each other in the X axis direction with their magnetic poles directed in the same direction with respect to the focus coil 3. Accordingly, as shown in FIG. 6, the distribution of the magnetic flux density through the focus coil 3 has two maximum points.

In the second embodiment, the individual parts are disposed so that the relation between the mounting pitch Tp of the tracking coils 4 in the X axis direction, the winding width Tw thereof, and the tracking movable range Td, and the width W of a permanent magnet 105 in the X axis direction, and the mounting pitch P thereof satisfies the expression (1) below:

$$Tp+Tw+Td \leq P+W \tag{1}$$

Figure 22:
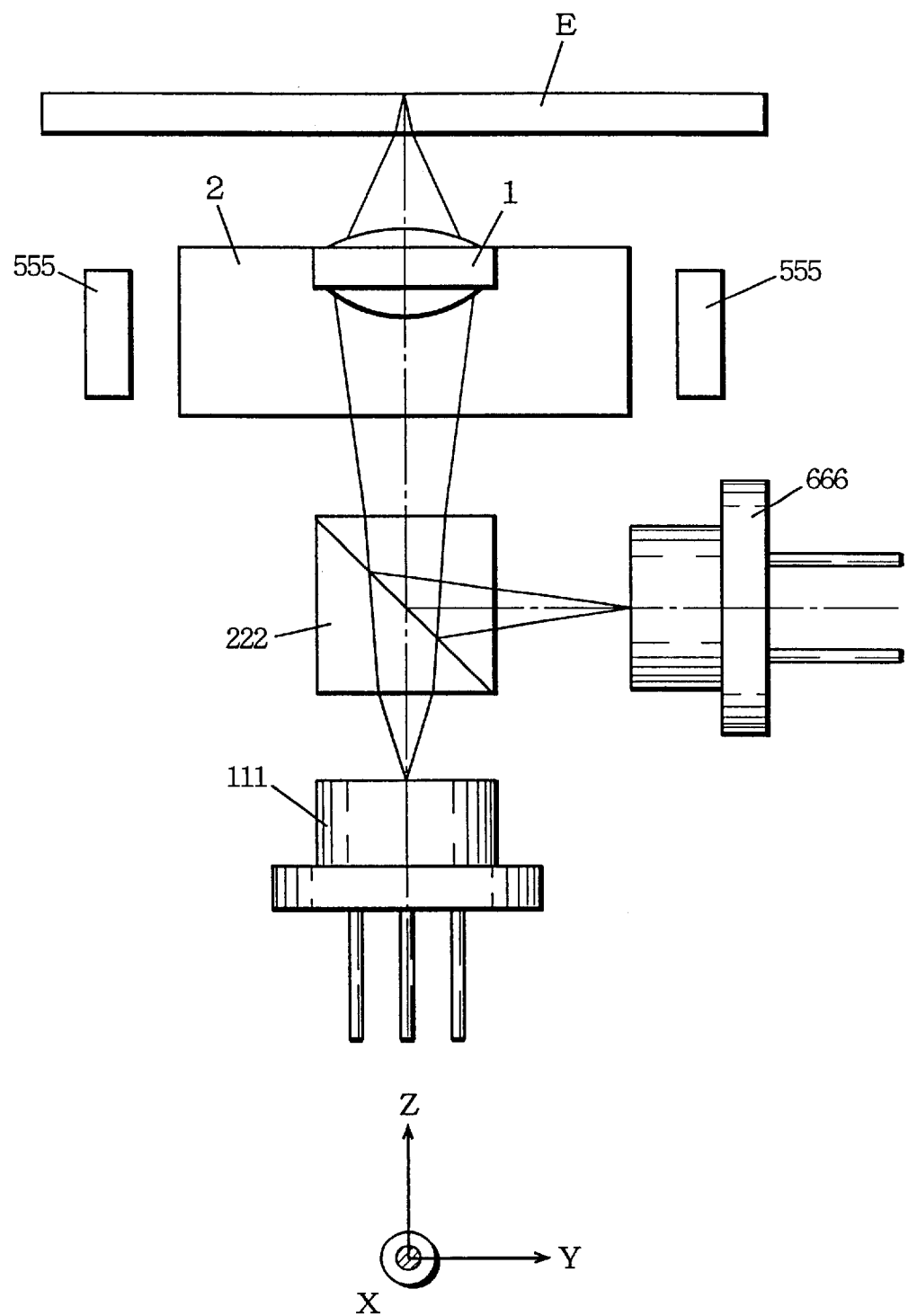
FIG. 22 is a diagram showing the outline of the structure of an optical pickup installed in the optical disk device.
Figure 23:
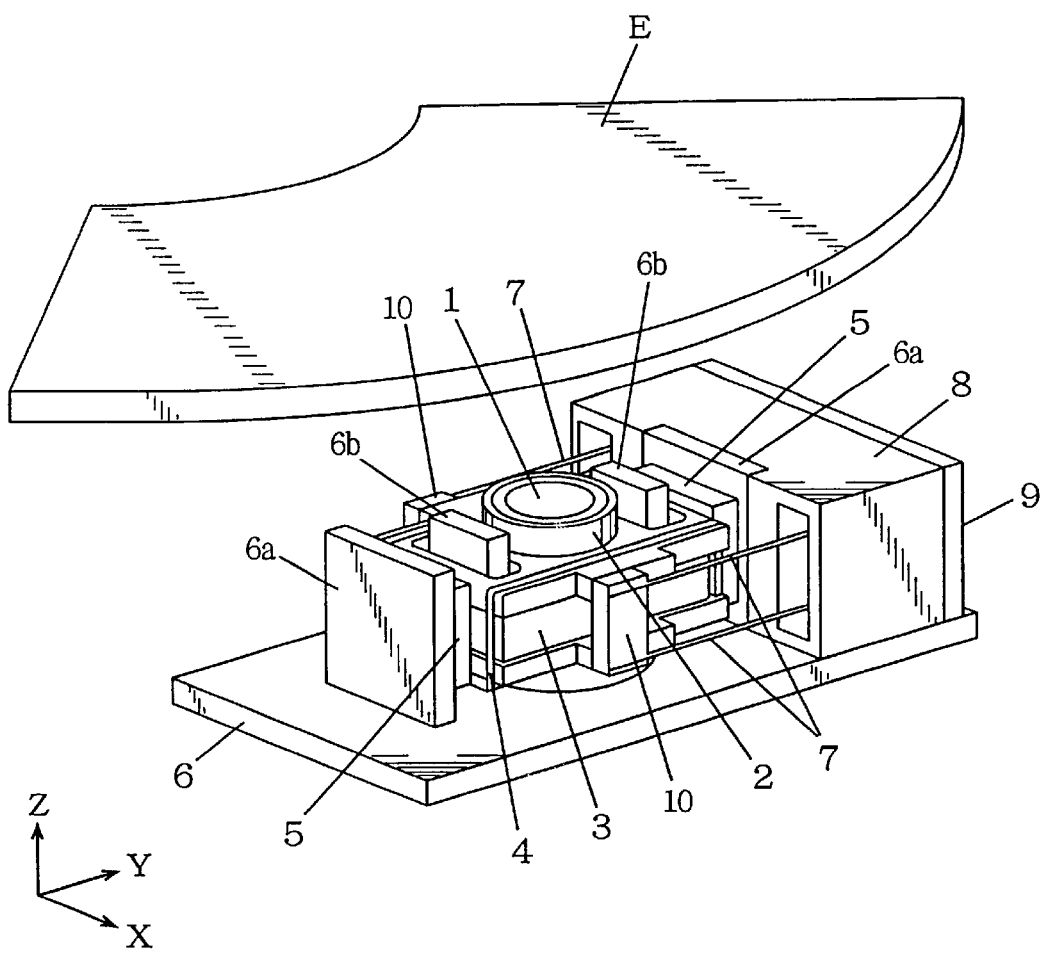
FIG. 23 is a perspective view showing the structure of a conventional objective lens actuator.
Figure 24:
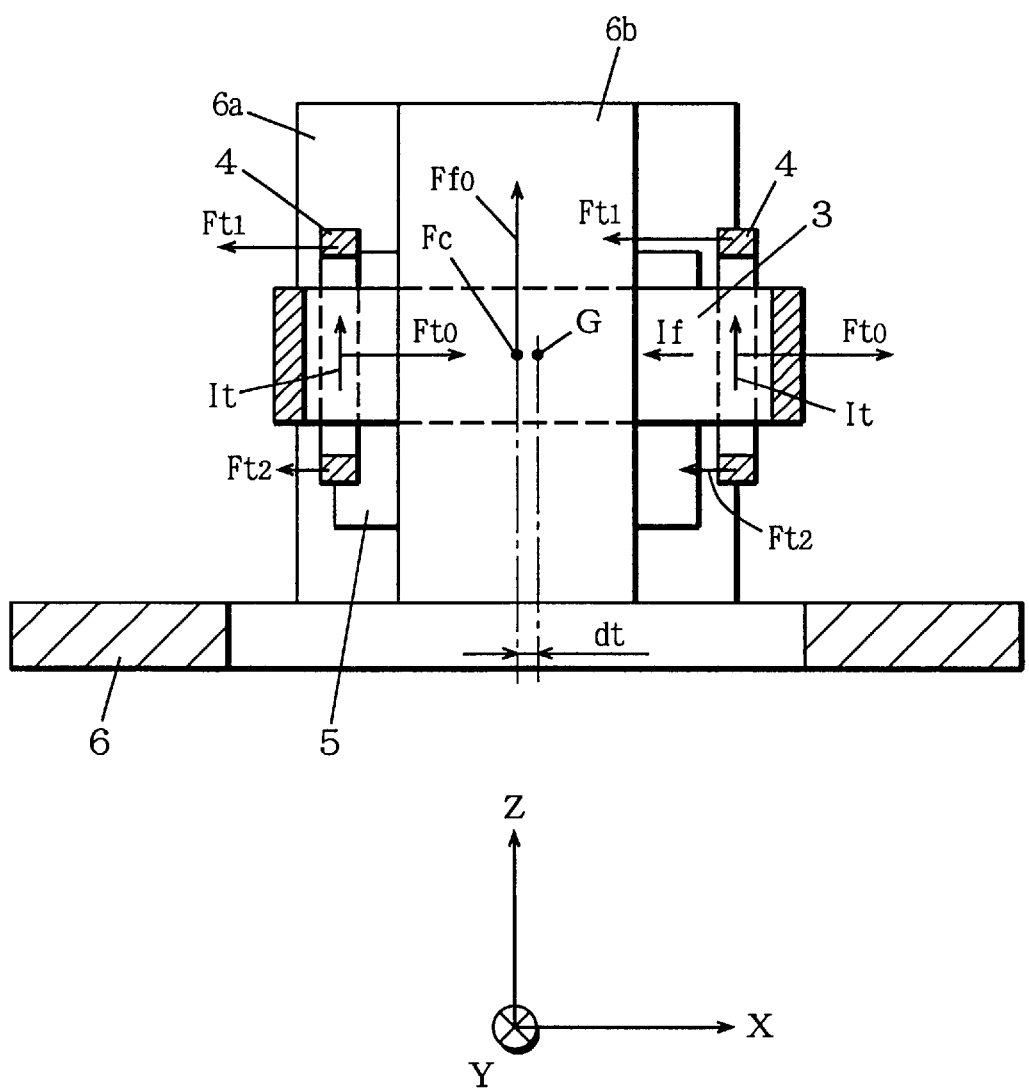
FIG. 24 is a cross-sectional view showing a main part of the conventional objective lens actuator which is moving the objective lens in the focus direction (Z-axis direction) and the tracking direction (X-axis direction.)
Figure 25:
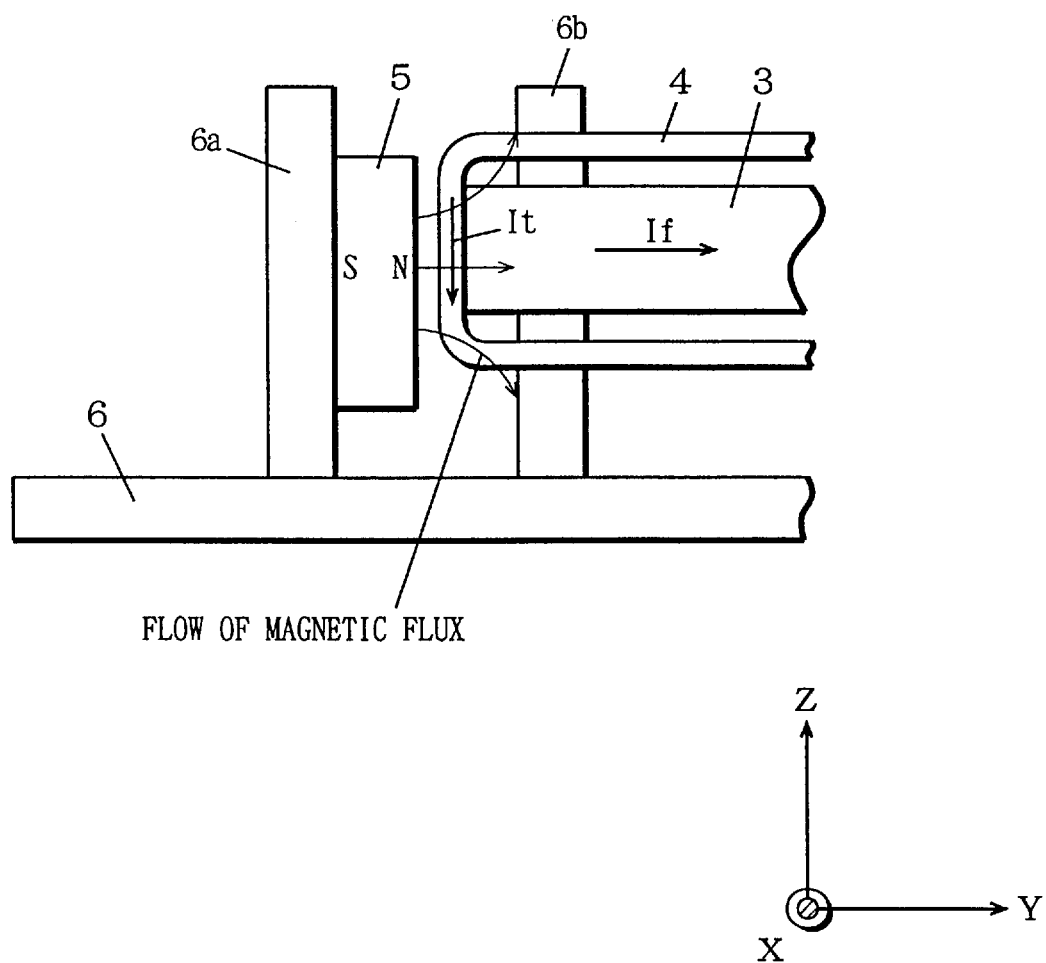
FIG. 25 is a side view of the main part moving the objective lens in the focus direction and the tracking direction in the conventional objective lens actuator.
Figure 26:
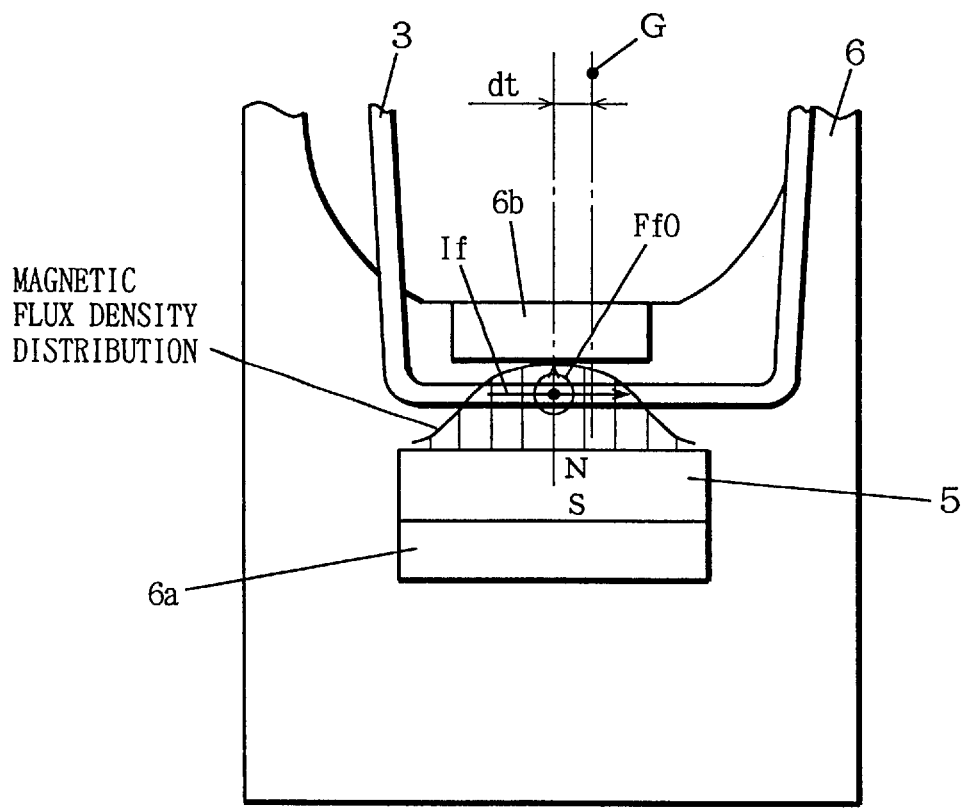
FIG. 26 is a top view of the main part of the electromagnetic circuit in the conventional objective lens actuator in the case where a positional error exists in the X-axis direction.

The yoke base 6 forming the magnetic yoke with the back yokes 6a and the facing yokes 6b fixes the supporting member fixing portion 8 and is fixed on an optical substrate (not shown) holding the semiconductor laser 111, the beam splitter 222 and the photodetector 666 shown in FIG. 22.

Next, the operation for driving the objective lens 1 along the two axes in the focus direction and the tracking direction to correct the focus error caused by the up-and-down movement due to a warp of the optical disk E and the tracking error caused by its eccentricity will be explained.

The driving force in the focus direction is produced by the electromagnetic driving circuit in which the focus coil 3 is disposed in the gap of the magnetic circuit composed of the permanent magnets 105, the back yokes 6a, and the opposing yokes 6b mounted on the yoke base 6. The driving force generated in the focus direction causes the lens holder 2 to translate in the focus direction through the elastic supporting members 7.

The driving force in the tracking direction is generated by the electromagnetic driving circuit in which the tracking coils 4 are disposed in the gap in the magnetic circuit formed of the permanent magnets 105, the back yokes 6a, and the opposing yokes 6b attached to the yoke base 6. The driving force generated in the tracking direction translates the lens holder 2 in the tracking direction through the elastic supporting members 7.

Since the parts of the tracking coils 4 which are parallel to the Z axis direction serving as a main source of the driving force are close to the permanent magnets 105, the driving force generated is affected by the positional relation with the permanent magnets 105. In FIG. 6, if a tracking coil 4 protrudes in the X axis direction beyond the permanent magnet 105, the driving force generated in the tracking coil 4 is extremely deteriorated. That is to say, if a tracking coil 4 protrudes in the X axis direction beyond the permanent magnet 105 in the tracking moveable range Td, the driving force generated by the tracking coil 4 is extremely deteriorated to lose linearity.

As stated above, in the objective lens actuator of the second embodiment, the components are disposed so that the sum of the mounting pitch P of the permanent magnets 105 and the width W of the permanent magnet 105 in the X axis direction is equal to or larger than the sum of the mounting pitch Tp in the X axis direction of the tracking coils 4, the winding width Tw thereof, and the tracking movable range Td, that is, so that the expression (1) given above holds. Accordingly, one of the tracking coils 4 does not protrude beyond the permanent magnet 105 even if the lens holder 2 is moved for the tracking movable range, Td.

When the difference between the mounting pitch P of the permanent magnets 105 and the width W in the X axis direction of the permanent magnets 105 is equal to or less than the mounting pitch Tp in the X axis direction of the tracking coils 4 minus the winding width Tw thereof and the tracking movable range Td, that is, when the relation of the expression (2) below holds, one of the tracking coils 4 does not protrude within the permanent magnet 105 when the lens holder 2 moves for the tracking movable range Td.

$$Tp-Tw-Td \geq P-W \tag{2}$$

As stated above, if the expression (1) and/or the expression (2) is/are satisfied, the driving force generated by the tracking coils 4 is not drastically decreased in the tracking movable range Td.

FIG. 7 shows the results of simulation of the relation under the conditions that the width W of the permanent magnet 105 in the X direction was 2.5 mm, the mounting pitch Tp of the tracking coils 4 in the X axis direction was 6.0 mm, the winding width Tw of the tracking coil 4 in the X axis direction was 0.5 mm, and the tracking driving range Td was 0.5 mm. As shown in FIG. 7, it is seen that the tracking driving force is almost flat when the mounting pitch P of the permanent magnets 105 is between 5.5 mm and 7.5 mm and it is extremely deteriorated in the other region.

The mechanism for suppressing the torque around the Y axis of the focus coil 3 in the second embodiment is the same as that of the above-described first embodiment and hence not described again.

As has been explained above, in the objective lens actuator according to the second embodiment, both the focus coil 3 and the tracking coils 4 are wound around the sides of the lens holder 2 holding the objective lens 1 and a pair of permanent magnets 105 spaced apart in the X axis direction are disposed to face each of the two sides of the focus coil 3 which are parallel to the X axis direction, with the mounting pitch Tp in the X axis direction of the tracking coils 4 and the winding width Tw thereof, the tracking movable range Td, and the width W in the X axis direction of the permanent magnet 105, and the mounting pitch P of the permanent magnets satisfying the expression (1) and/or the expression (2). This provides, in addition to the effect of the first embodiment, large tracking driving sensitivity even when the focus driving and the tracking driving are implemented with a common magnetic circuit, and thus provides low power consumption.

(Third Embodiment)

Figure 8:
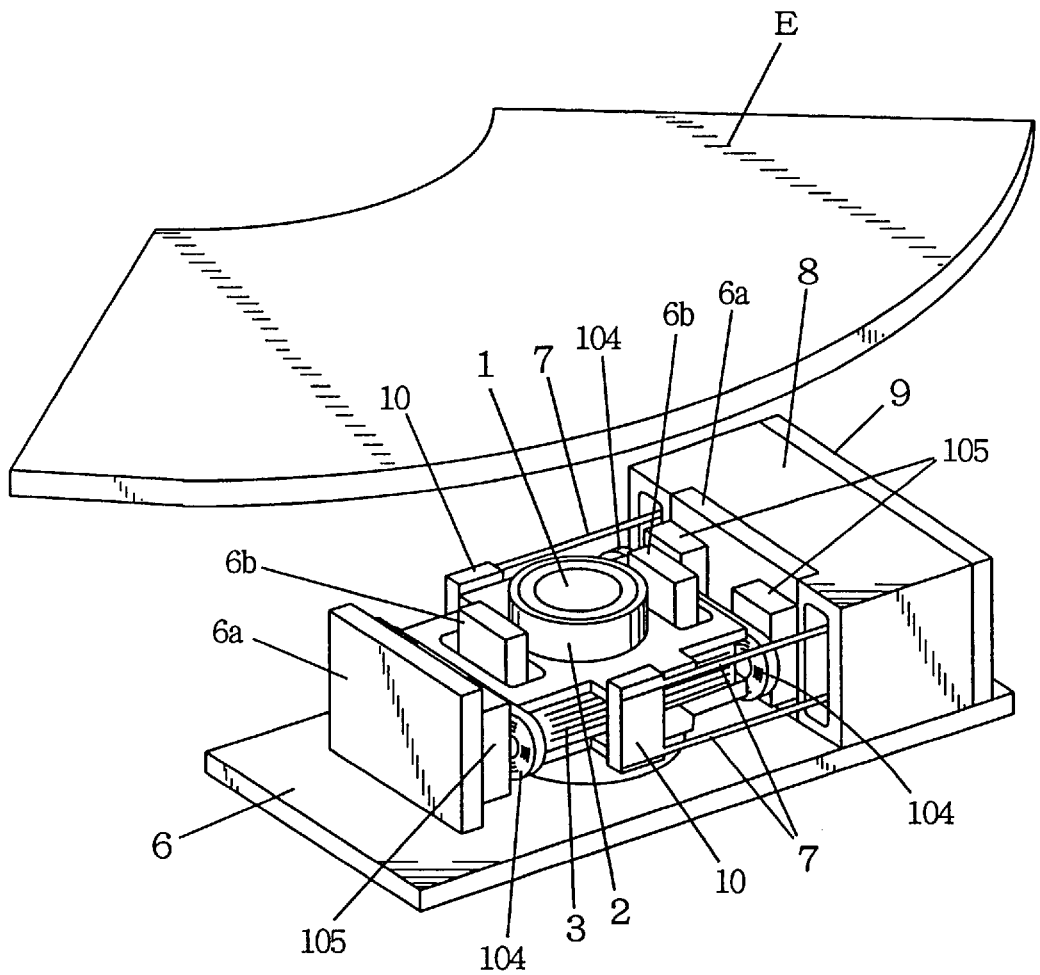
FIG. 8 is a perspective view of an objective lens actuator according to a third embodiment of the present invention.
Figure 9:
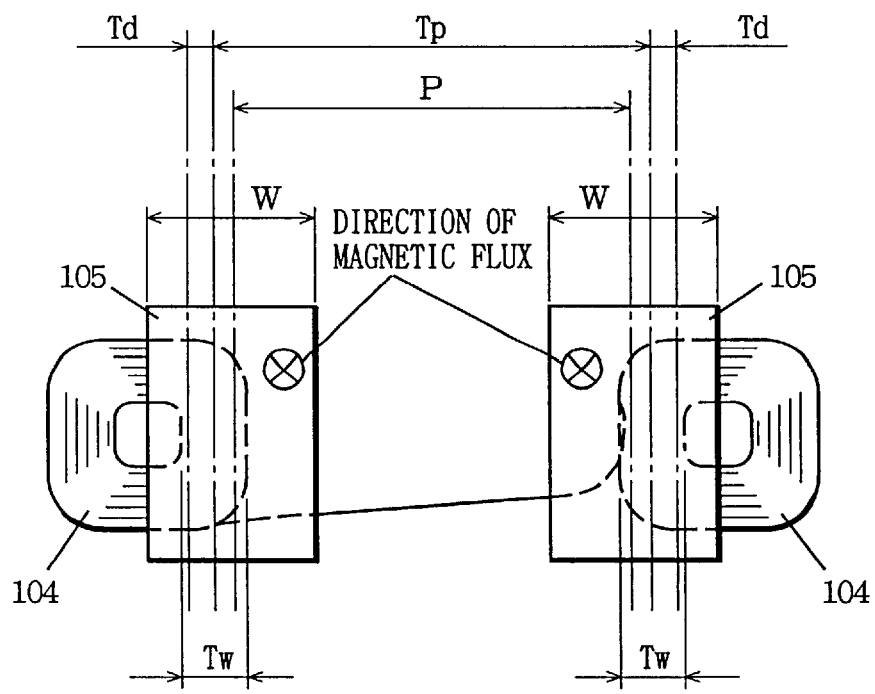
FIG. 9 is a side view of the main part of the electromagnetic circuit of the objective lens actuator of the third embodiment.

FIG. 8 is a perspective view of an objective lens actuator according to a third embodiment of the present invention. FIG. 9 is a side view of the main part of the electromagnetic circuit of the objective lens actuator. In FIG. 8 and FIG. 9, the components having the same functions as those in the second embodiment shown in FIG. 5 and FIG. 6 are shown at the same characters and not described in detail again.

In the second embodiment shown in FIG. 5 and FIG. 6, the tracking coils 4 are wound around the X axis on the sides of the lens holder 2. In contrast, in the third embodiment shown in FIG. 8 and FIG. 9, the tracking coils 104 are wound around the Y axis. A pair of tracking coils 104 is provided on each of the two sides of the lens holder 2 which extend along the X axis direction. Each set of tracking coils 104 includes two windings around different cores, which are disposed in symmetrical positions on either side of the axis of symmetry of the pair of permanent magnets 105 spaced apart in the X axis direction. In other respects, the structure of the third embodiment is the same as that of the second embodiment shown in FIG. 5 and FIG. 6.

The mounting pitch Tp between the opposing sides of the tracking coils 104 whose winding directions have components parallel to the focus direction (Z axis direction), the winding width Tw thereof, the tracking movable range Td, the width W of the permanent magnet 105 in the X axis direction, and the mounting pitch P thereof satisfy the expression (3) and/or the expression (4) below:

$$Tp+Tw+Td \leq P+W \tag{3}$$

$$Tp-Tw-Td \geq P-W \tag{4}$$

The operation of the third embodiment and its mechanism for suppressing the torque around the Y axis of the focus coil 3 are the same as those in the first and second embodiments and hence not described again.

In addition to the effects of the first and second embodiments, the third embodiment constructed as explained above allows the winding cores of the tracking coils 104 to be freely set to reduce the unnecessary length of the windings of the tracking coils 104, so as to reduce the resistance value.

Although the tracking coils 104 are composed of winding coils in the third embodiment, it goes without saying that the tracking coils 104 can be formed as pattern on printed boards or flexible boards to provide the same effect.

(Fourth Embodiment)

Figure 10:
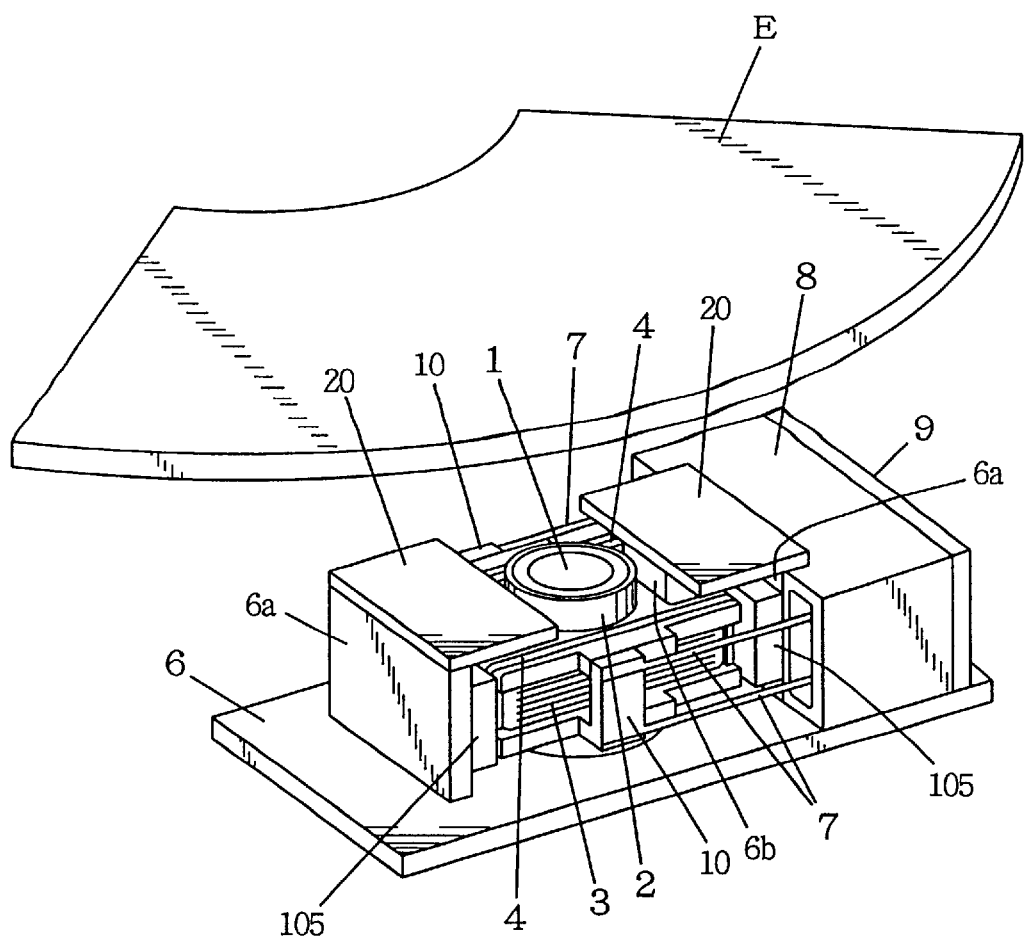
FIG. 10 is a perspective view showing the structure of an objective lens actuator according to a fourth embodiment of the present invention.
Figure 11:
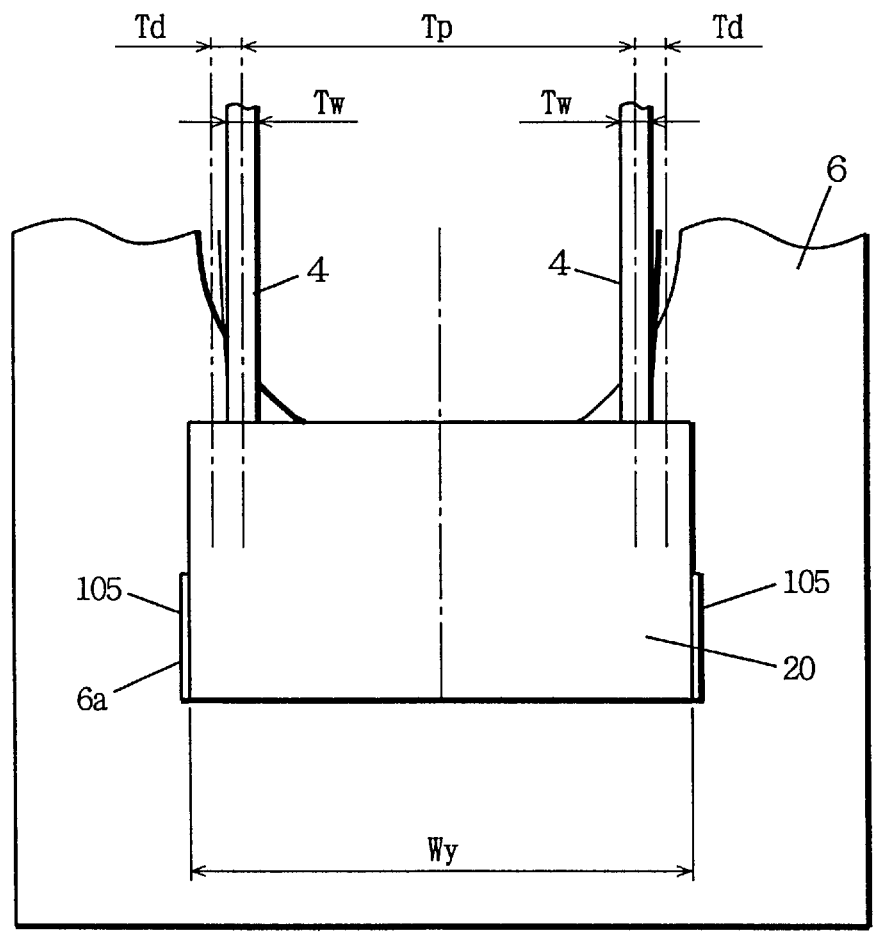
FIG. 11 is a top view of the main part of the objective lens actuator of the fourth embodiment.
Figure 11:
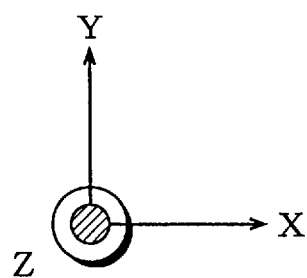
Figure 12:
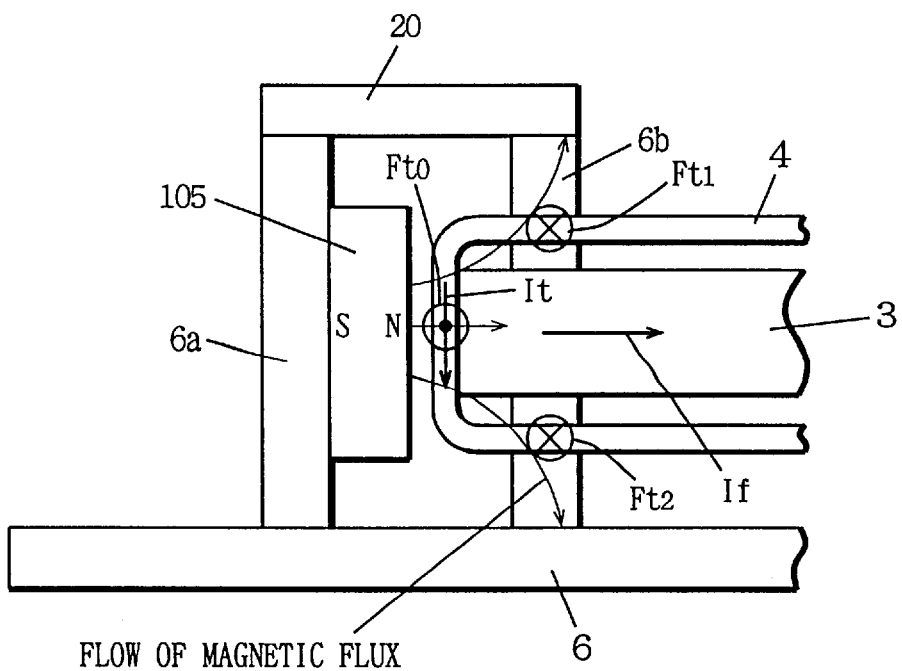
FIG. 12 is a side view of the main part of the objective lens actuator of the fourth embodiment.
Figure 12:
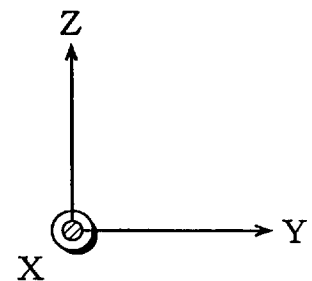

FIG. 10 is a perspective view showing the structure of an objective lens actuator according to a fourth embodiment of the present invention. FIG. 11 is a top view of the main part of the objective lens actuator. FIG. 12 is a side view of the main part of the objective lens actuator. In FIG. 10 to FIG. 12, the components having the same functions as those in the second embodiment depicted in FIG. 5 and FIG. 6 are shown at the same reference characters and not explained in detail again.

The fourth embodiment shown in FIG. 10 to FIG. 12 differs from the second embodiment shown in FIG. 5 and FIG. 6 in that cover yokes 20 formed of a ferromagnetic material, such as iron, are provided to extend in the Y axis direction (the direction parallel to the optical disk E) on the respective top ends of the back yokes 6a and the opposing yokes 6b (their respective top ends closer to the optical disk E) forming a magnetic circuit with the permanent magnets 105.

The mounting pitch Tp of the tracking coils 4 in the X axis direction, the winding width Tw thereof, the tracking movable range Td, and the width Wy of a cover yoke 20 in the X axis direction satisfy the relation given by the expression (5) below:

$$Wy \geq Tp+Tw+Td \tag{5}$$

Next, the mechanism for suppressing the torque around the Y axis by the tracking coils 4 in the fourth embodiment will be described.

In FIG. 12, when the driving current It flows in the tracking coil 4, while the Ft0 in the X axis plus direction is generated in the two sides of the tracking coil 4 which are parallel to the Z axis, the driving forces Ft1 and Ft2 in the X axis minus direction are generated in its two sides parallel to the Y axis because the magnetic flux goes therethrough in the focus direction (Z axis direction.) If a difference occurs between the driving forces Ft1 and Ft2, torque is caused around the Y axis.

In the fourth embodiment, the cover yokes 20 cause the magnetoresistance in the Z axis direction to be symmetrical with respect to the permanent magnets 105 and hence uniform magnetic flux passes through the two sides of the tracking coil 4 which are parallel to the Y axis. That is to say, the driving forces Ft1 and Ft2 become equal in magnitude, causing no torque around the Y axis. Then when the expression (5) above is satisfied, the driving forces Ft1 and Ft2 are equal in the tracking movable range Td, reducing the torque around the Y axis generated by the tracking coils 4.

The rest of operation of the fourth embodiment and its mechanism for suppressing the torque around the Y axis by the focus coil 3 are the same as those in the first embodiment and hence not described here.

In addition to the effects of the first and second embodiments, the objective lens actuator according to the fourth embodiment reduces the rotational torque around the Y axis generated by the tracking coils 4, which further reduces the inclination of the optical axis.

(Fifth Embodiment)

Figure 13:
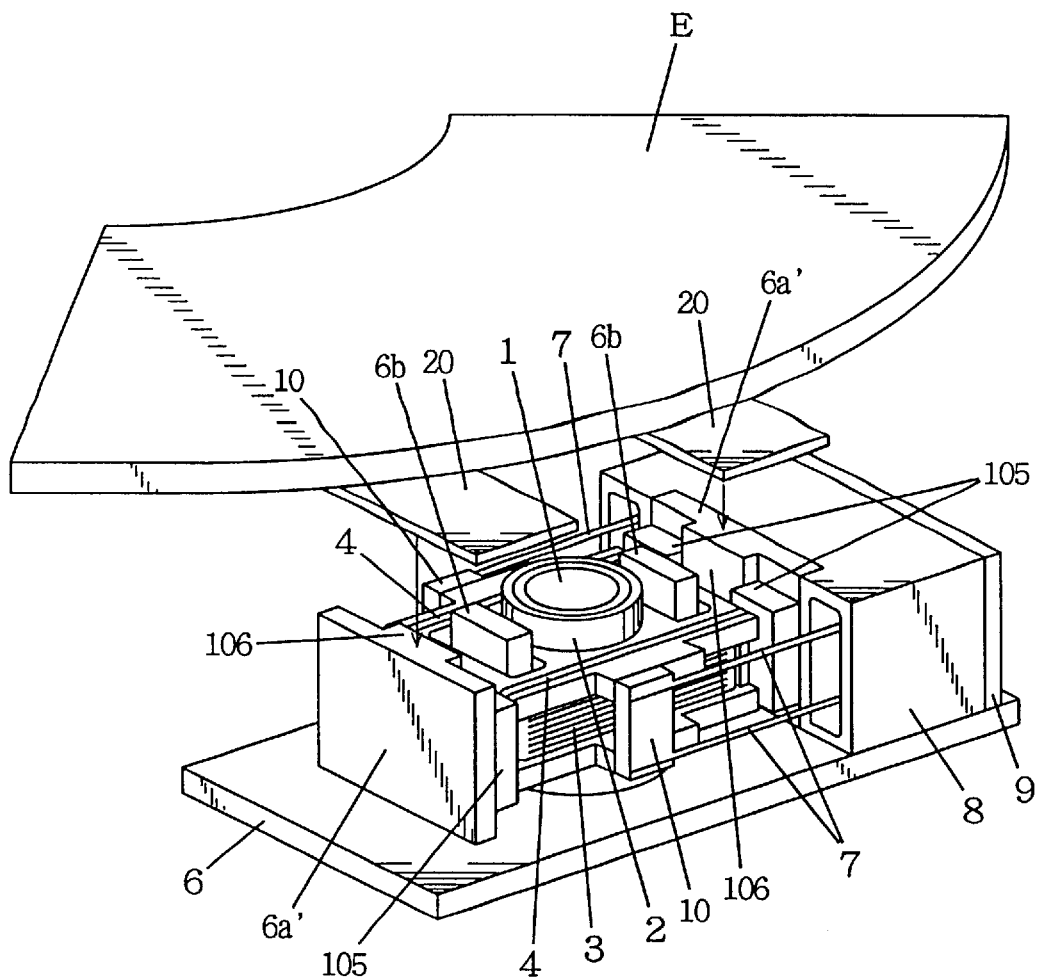
FIG. 13 is a perspective view showing the structure of an objective lens actuator according to a fifth embodiment of the present invention.

FIG. 13 is a perspective view showing the structure of an objective lens actuator according to a fifth embodiment of the present invention. In FIG. 13, the components having the same functions as those in the fourth embodiment depicted in FIG. 10 and FIG. 12 are shown at the same reference characters and not described in detail again.

The fifth embodiment shown in FIG. 13 is different from the fourth embodiment shown in FIG. 10 to FIG. 12 in that back yokes 6a' having a central projection 106 are provided in place of the flat back yokes 6a. That is to say, a back yoke 6a' has the central projection 106 extending in the Z axis direction approximately in the center of the surface in contact with the permanent magnets 105.

Next, the method of mounting the permanent magnets 105 to the back yoke 6a' will be explained. The pair of permanent magnets 105 are positioned in the X axis direction with their respective back sides abutting on the plane parts (the parts other than the central projection 106) of the back yoke 6a' and their respective inner sides abutting on the sides of the central projection 106. Then the magnetic attraction of the pair of permanent magnets 105 acts to the plane parts and the central projection 106 of the back yoke 6a' and thus the permanent magnets 105 can be stably positioned.

Other respects of the operation of the fifth embodiment and its mechanism for suppressing the torque around the Y axis are the same as those in the fourth embodiment and not described again.

In addition to the effect of the fourth embodiment, the fifth embodiment constructed as stated above allows the pair of permanent magnets 105 to be positioned easily and stably, leading to improvement of quality.

(Sixth Embodiment)

Figure 14:
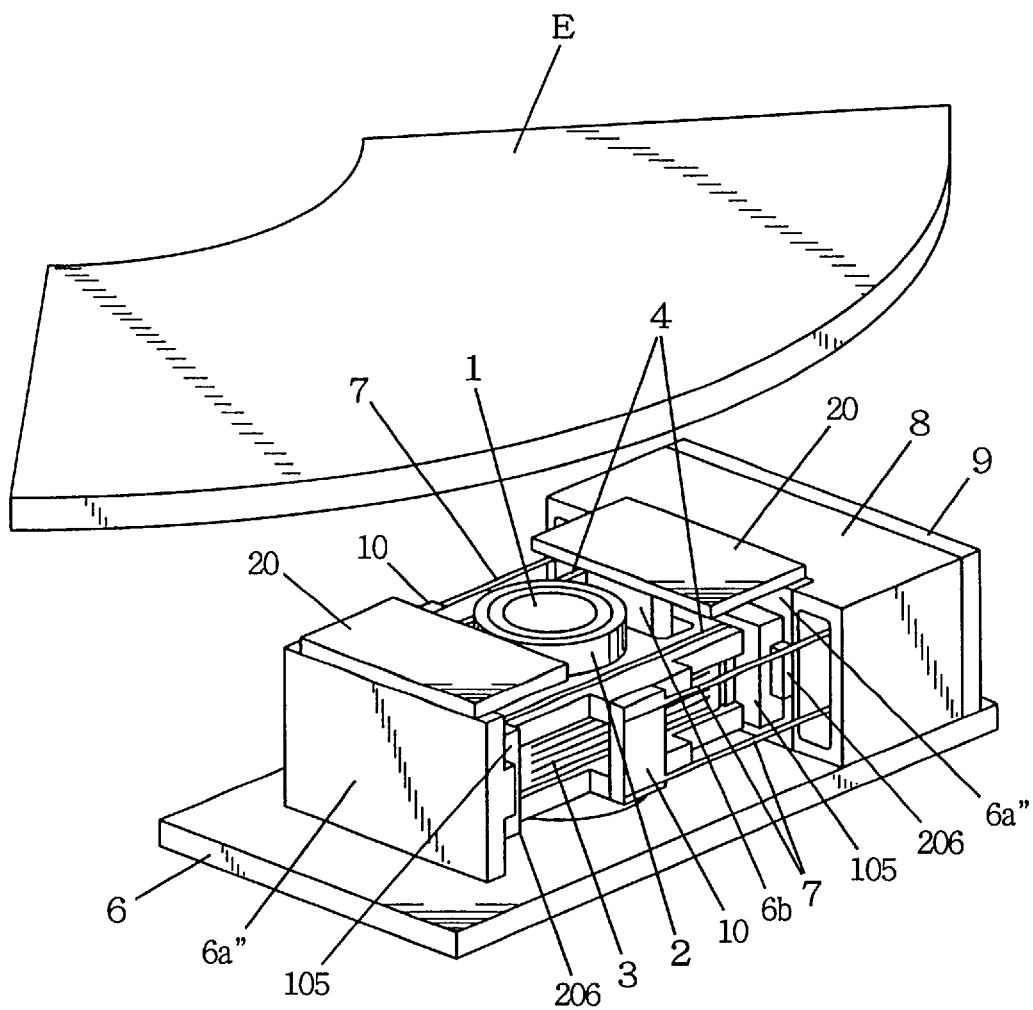
FIG. 14 is a perspective view showing the structure of an objective lens actuator according to a sixth embodiment of the present invention.

FIG. 14 is a perspective view showing the structure of an objective lens actuator according to a sixth embodiment of the present invention. In FIG. 14, the components having the same functions as those in the fourth embodiment depicted in FIG. 10 to FIG. 12 are shown at the same reference characters and not described in detail again.

The sixth embodiment shown in FIG. 14 differs from the fourth embodiment shown in FIG. 10 to FIG. 12 in that back yokes 6a" having outer projections 206 are provided in place of the flat back yokes 6a. That is to say, a back yoke 6a" has outer projections 206 extending in the Z axis direction at the both outside ends of the surface in contact with the permanent magnets 105.

Next, the method of attaching the permanent magnets 105 to the back yoke 6a" will be explained. The two permanent magnets 105 in a pair are positioned in the X axis direction with their respective back sides abutting on the flat part (the part excluding the outer projections 206) of the back yoke 6a" and their respective outer sides abutting on the sides of the outer projections 206. A repulsive force acts between the inner sides of the pair of permanent magnets 105.

Accordingly, when the mounting pitch between the pair of permanent magnets 105 is decreased, the two permanent magnets 105 attempt to separate away from each other. Hence, it is necessary in the fourth embodiment to set a large mounting pitch between a pair of permanent magnets 105. In the sixth embodiment, however, the outer projections 206 formed on the back yoke 6a" limit shift of the permanent magnets 105, even if a repulsive force occurs between the pair of permanent magnets 105, not to allow them to further shift outward. That is to say, the permanent magnets 105 are positioned in a self-aligning manner, causing no positional shift in the X axis direction. The sixth embodiment thus allows the pair of permanent magnets 105 to be mounted at a smaller pitch.

In other respects, the operation of the sixth embodiment and its mechanism for suppressing the torque around the Y axis are the same as those in the fourth embodiment and not described here again.

In addition to the effects of the fourth and fifth embodiment, the sixth embodiment constructed as stated above allows a pair of permanent magnets 105 to be attached at a small pitch, which in turn allows size reduction of the objective lens actuator.

(Seventh Embodiment)

Figure 15:
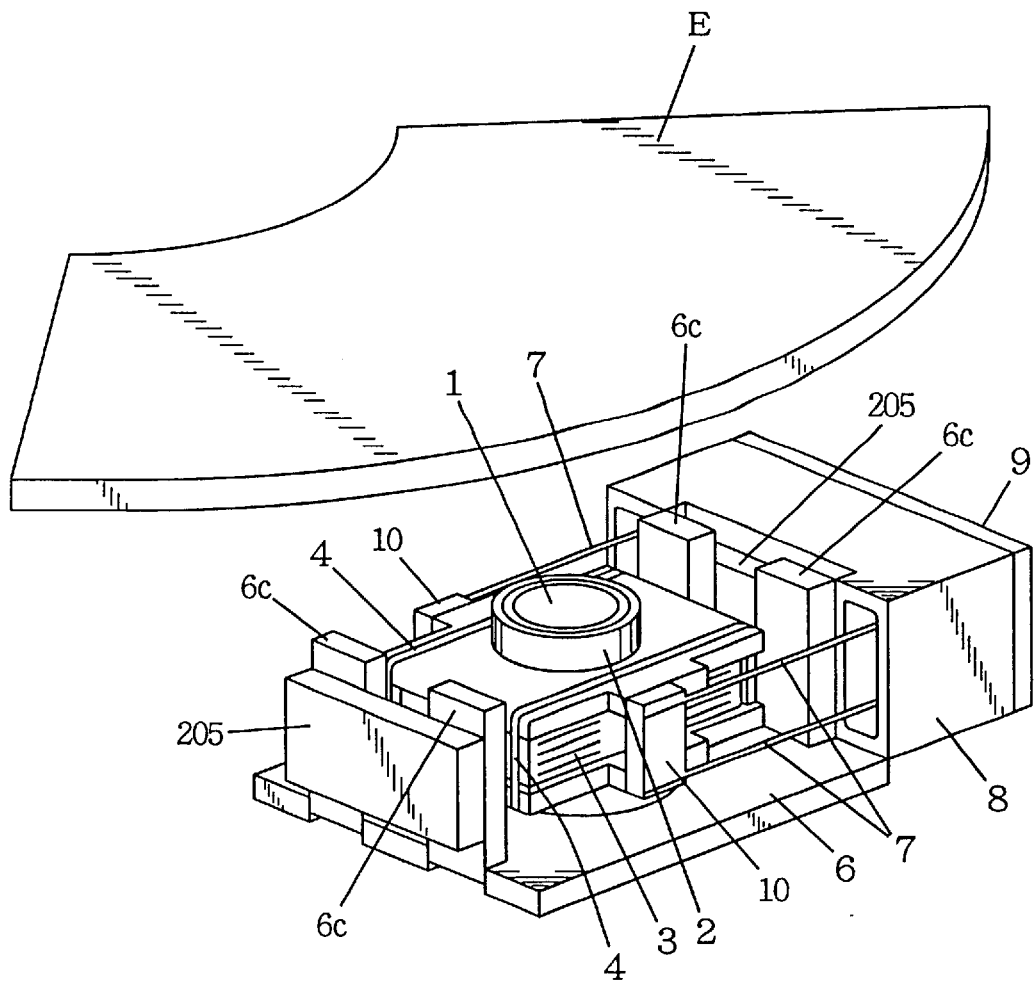
FIG. 15 is a perspective view showing the structure of an objective lens actuator according to a seventh embodiment of the present invention.
Figure 16:
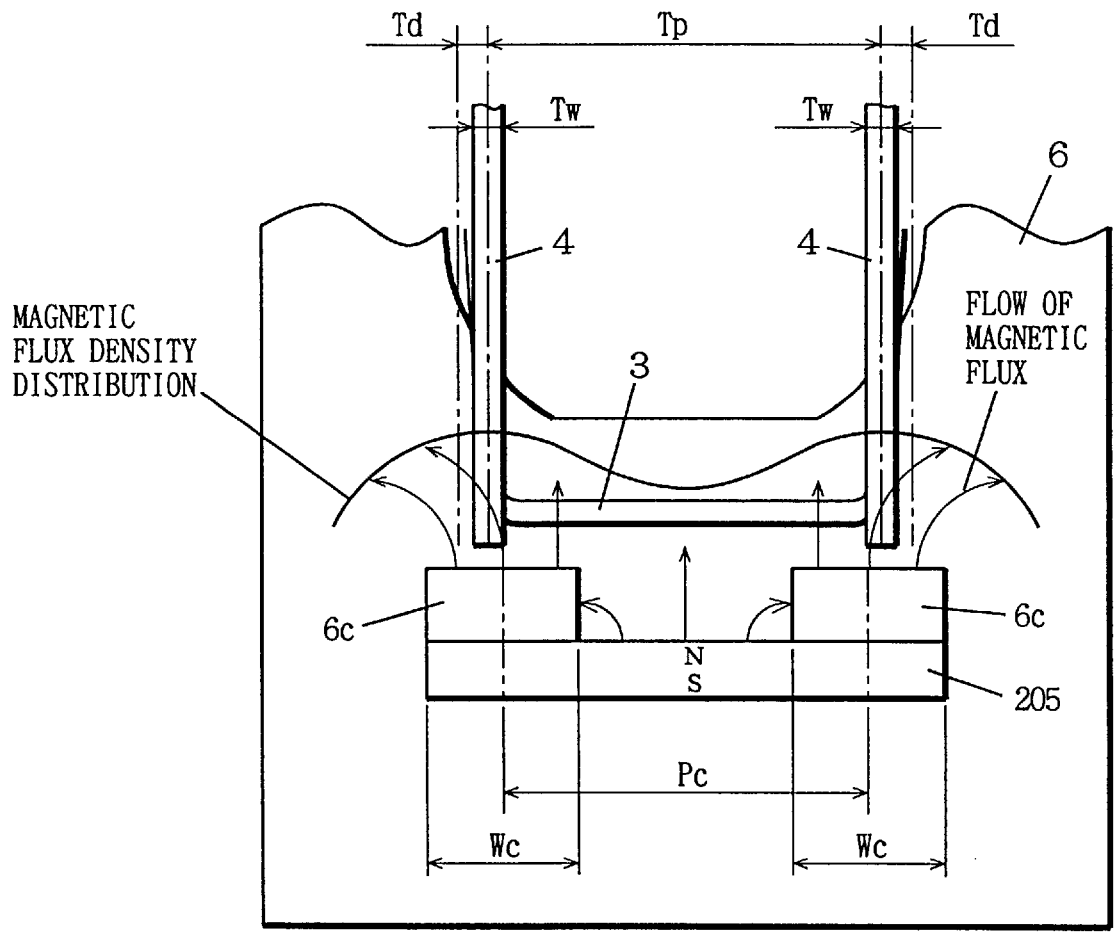
FIG. 16 is a top view of the main part of the electromagnetic circuit in the objective lens actuator of the seventh embodiment.
Figure 16:
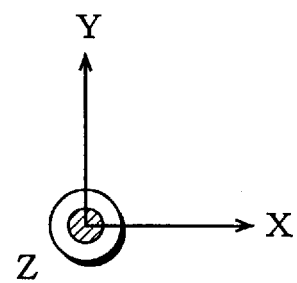

FIG. 15 is a perspective view showing the structure of an objective lens actuator according to a seventh embodiment of the present invention. FIG. 16 is a top view of the main part of the electromagnetic circuit in the objective lens actuator. In FIG. 15 and FIG. 16, the components having the same functions as those in the second embodiment depicted in FIG. 5 and FIG. 6 are shown at the same reference characters and not described in detail again.

Referring to FIG. 15 and FIG. 16, the seventh embodiment includes divided yokes 6c in place of the back yokes 6a and the opposing yokes 6b in the second embodiment shown in FIG. 5 and FIG. 6 and permanent magnets 205 in place of the permanent magnets 105.

Two divided yokes 6c are disposed to face each of the two sides of the focus coil 3 that are parallel to the X axis direction. A pair of divided yokes (two divided yokes facing the same face of the focus coil 3) 6c are disposed at an interval in the X axis direction. A permanent magnet 205 is fixed on the back sides of the divided yokes 6c (the sides opposite to their surfaces facing the focus coil 3.)

In the seventh embodiment, the width Wc of the divided yoke 6c in the X axis direction and the provision pitch Pc thereof satisfy the relation given by the expression (6):

$$Pc - Wc > 0 \tag{6}$$

In the seventh embodiment, the mounting pitch Tp of the tracking coils 4 in the X axis direction, the winding width Tw thereof, the tracking movable range Td, the width Wc of the divided yoke 6c in the X direction and the provision pitch Pc thereof satisfy the relation given by the expression (7) and/or the expression (8):

$$Tp + Tw + Td \leq Pc + Wc \tag{7}$$

$$Tp - Tw - Td \geq Pc - Wc \tag{8}$$

Next, the flow of magnetic flux in the magnetic circuit in the seventh embodiment will be explained referring to FIG. 16. The poles of the permanent magnet 205 are oriented in the Y axis direction. Without the divided yokes 6c, the magnetic flux density is high in the neighborhood of the center of the distribution, as in the conventional objective lens actuator (refer to FIG. 26.) On the other hand, in the seventh embodiment, the divided yokes 6c disperse the magnetic flux, part of which returns to the permanent magnet 205 through the divided yokes 6c and the remainder of which forms a uniform magnetic flux density distribution toward the focus coil 3 and the tracking coils 4.

In other respects, the operation of the seventh embodiment and its mechanism for suppressing the torque around the Y axis are the same as those in the second embodiment and hence not described again.

In addition to the effect of the second embodiment, the seventh embodiment constructed as stated above enables a structure with a single permanent magnet 205 on each side, reducing the number of parts, which results in a decreased price.

(Eighth Embodiment)

Figure 17:
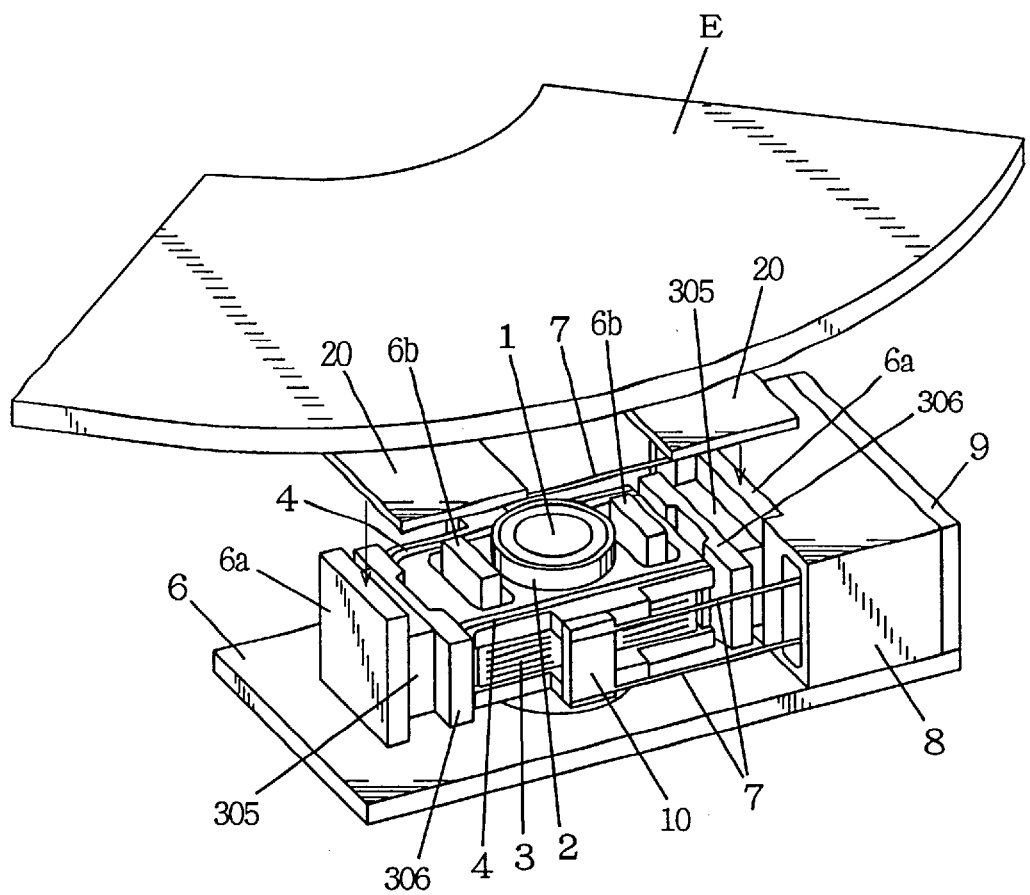
FIG. 17 is a perspective view showing the structure of an objective lens actuator according to an eighth embodiment of the present invention.
Figure 18:
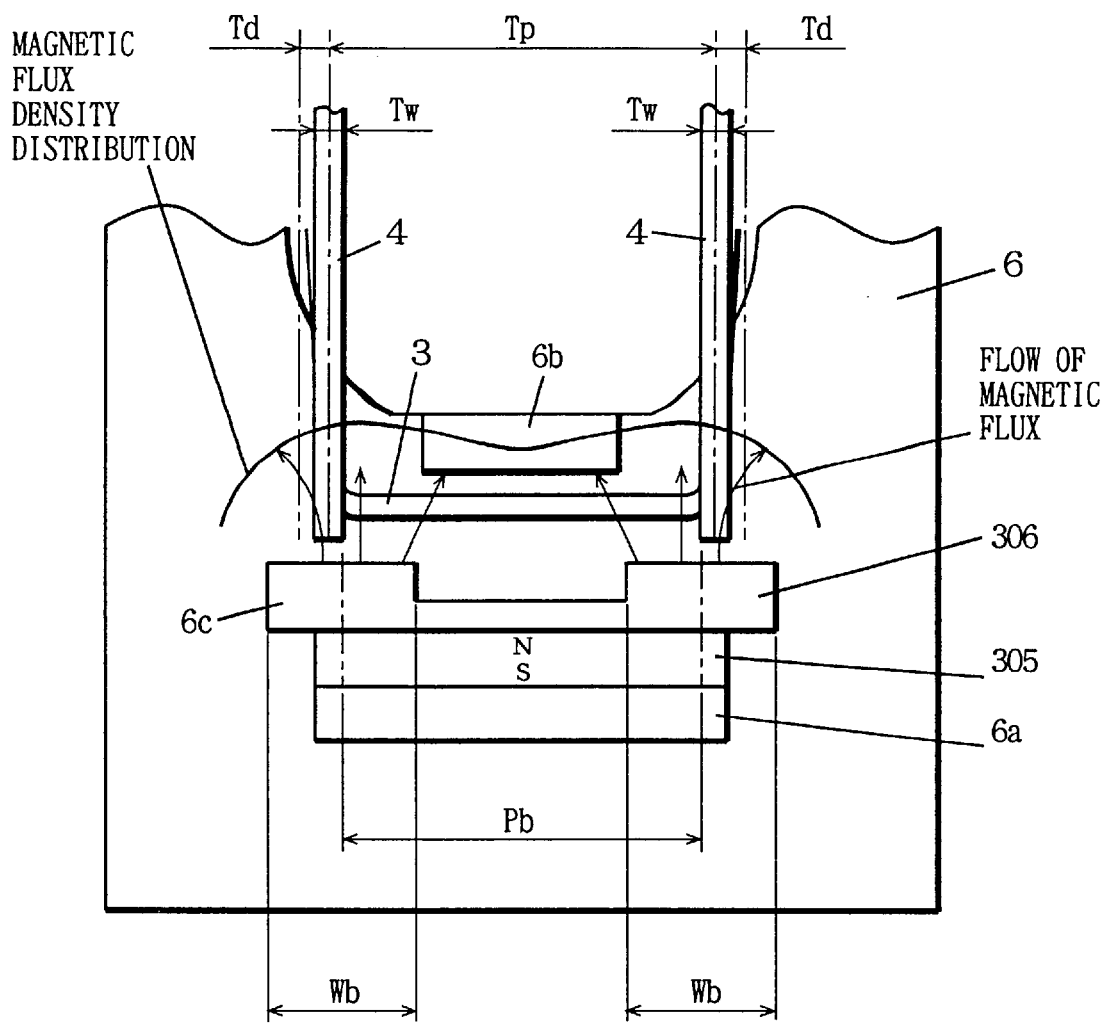
FIG. 18 is a top view of the main part of the electromagnetic circuit of the objective lens actuator of the eighth embodiment.
Figure 18:
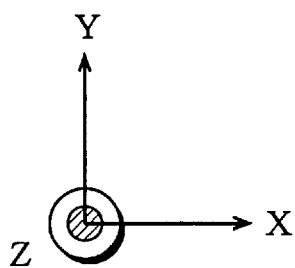

FIG. 17 is a perspective view showing the structure of an objective lens actuator according to an eighth embodiment of the present invention. FIG. 18 is a top view of the main part of the electromagnetic circuit of the objective lens actuator. In FIG. 17 and FIG. 18, the components having the same functions as those of the fourth embodiment depicted in FIG. 10 to FIG. 12 are shown at the same reference characters and not described in detail again.

Referring to FIG. 17 and FIG. 18, the eighth embodiment includes permanent magnets 305 in place of the permanent magnets 105 shown in FIG. 10 to FIG. 12, and also includes intermediate yokes 306 in addition.

An intermediate yoke 306, having a pair of projections on its both margins in the X axis direction, faces the focus coil 3 and the tracking coils 4 in the Y axis direction. A permanent magnet 305 is fixed on the back side (the opposite side to the side facing the focus coil 3) of the intermediate yoke 306. A back yoke 6a is provided to sandwich the permanent magnet 305 with the intermediate yoke 306 in the Y axis direction.

In the eighth embodiment, the relation between the width Wb in the X axis direction and the pitch Pb of the projections of the intermediate yoke 305 satisfy the relation given by the expression (9):

$$Pb-Wb>0 \tag{9}$$

In the eighth embodiment, the mounting pitch Tp of the tracking coils 4 in the X axis direction and the winding width Tw thereof, the tracking movable range Td, and the width Wb of the projection of the intermediate yoke 306 in the X axis direction and the pitch Pc satisfy the relation given by the expression (10) and the expression (11):

$$Tp+Tw+Td \leq Pb+Wb \tag{10}$$

$$Tp-Tw-Td \geq Pb-Wb \tag{11}$$

Next, the flow of magnetic flux in the eighth embodiment will be explained referring to FIG. 18. The magnetic poles of the permanent magnet 305 are oriented in the Y axis direction and the magnetic flux flows to the intermediate yoke 306. All magnetic flux of the intermediate yoke 306 flows from its two projections toward the focus coil 3 and the tracking coils 4, where the magnetic flux density distribution in the gap is approximately uniform. The magnetic flux then flows to the opposing yoke 6b, the yoke base 6 (or the cover yoke 20,) and the back yoke 6a, to return to the permanent magnet 305.

Other respects of the operation of the eighth embodiment and the mechanism for suppressing the torque around the Y axis are the same as those in the fourth embodiment and not described here again.

In addition to the effect of the fourth embodiment, the eighth embodiment constructed as explained above improves the efficiency of use of the magnetic flux to enable improvement of the driving sensitivity and reduction in size of the magnets, leading to reductions of size and power dissipation of the objective lens actuator.

(Ninth Embodiment)

Figure 19:
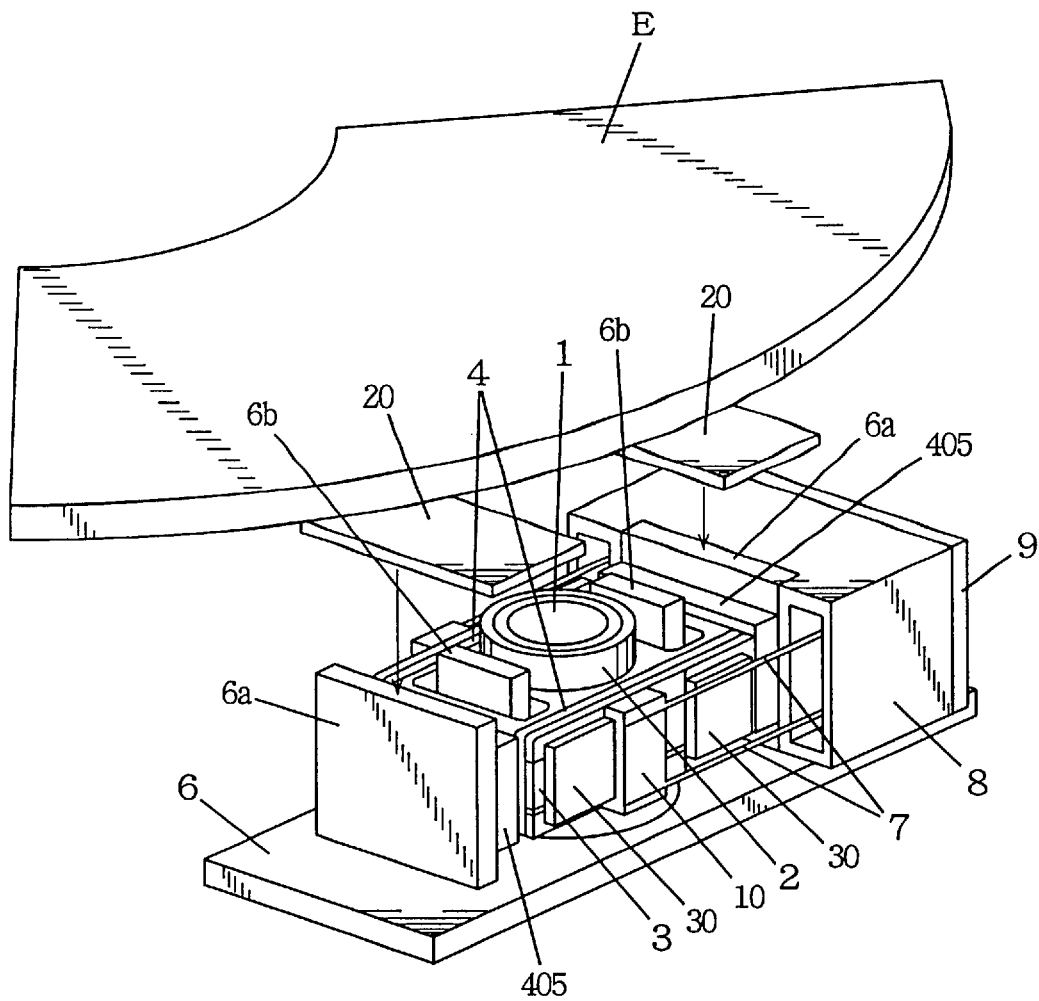
FIG. 19 is a perspective view showing the structure of an objective lens actuator according to a ninth embodiment of the present invention.
Figure 19:
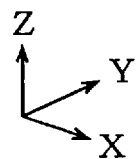
Figure 20:
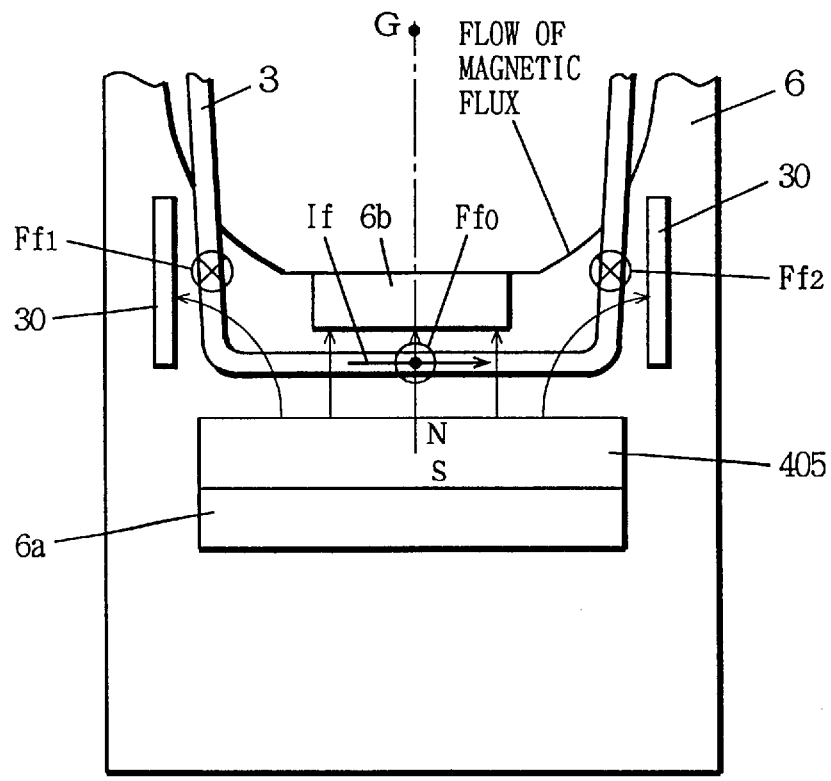
FIG. 20 is a top view of the main part of the objective lens actuator of the ninth embodiment.
Figure 20:
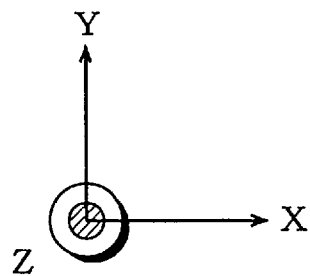

FIG. 19 is a perspective view showing the structure of an objective lens actuator according to a ninth embodiment of the present invention. FIG. 20 is a top view of the main part of the objective lens actuator. In FIG. 19 and FIG. 20, the components having the same functions as those in the fourth embodiment depicted in FIG. 10 and FIG. 11 are shown at the same reference characters and not described in detail again.

The ninth embodiment differs from the fourth embodiment shown in FIG. 10 and FIG. 11 in that a single permanent magnet 405 is disposed to face each of the two sides of the focus coil 3 which are parallel to the X axis direction and that two plate-like ferromagnetic pieces 30 are provided to face each of the two faces of the focus coil 3 which are parallel to the Y axis direction.

The elastic supporting members 7 support the lens holder 2 such that it can move in the focus direction (Z axis direction) and the tracking direction (X axis direction) and also enables application of current to the focus coil 3 and the tracking coils 4. The yoke base 6, the back yokes 6a, the opposing yokes 6b and the cover yokes 20 are all magnetic yokes, which form a magnetic circuit with the permanent magnets 405 fixed to the back yokes 6a.

The operation of driving the objective lens 1 along the two axes in the focus direction and the tracking direction to correct the focus error caused by the up-and-down movement due to a warp of the optical disk E and the tracking error caused by its eccentricity or the like is the same as that in the conventional example shown in FIG. 23 to FIG. 26 and hence it is not described again here.

Next, the mechanism for suppressing the torque around the Y axis in the focus coil 3 in the ninth embodiment will be explained referring to FIG. 20. The magnetic flux in the Y axis direction passes through the side of the focus coil 3 which is parallel to the X axis to generate the driving force Ff0 in the direction approaching the optical disk E by the electromagnetic action with the focus driving current If. On the other hand, the magnetic flux which has passed through the side of the focus coil 3 that is parallel to the X axis passes in the X axis direction through the two sides of the focus coil 3 that are parallel to the Y axis to gather into the ferromagnetic pieces 30. Then the electromagnetic action with the focus driving current If generates the driving force Ff1 on the X axis minus side, the one of the two sides of the focus coil 3, that is parallel to the Y axis and also generates the driving force Ff2 on the X axis plus side, the other side of the focus coil 3, both the driving forces being directed in the direction away from the optical disk E.

When the center of the focus coil 3 and the center of the magnetic circuit coincide, the center of generation of the driving force Ff0 coincides with the center of gravity, G, of the movable part composed of the objective lens 1, the lens holder 2, the focus coil 3, the tracking coils 4, the printed boards 10 and the ferromagnetic pieces 30. In this case, no torque is generated around the Y axis in the sides of the focus coil 3 that are parallel to the X axis. In the two sides of the focus coil 3 that are parallel to the Y axis, through which the magnetic flux uniformly passes, the driving forces Ff1 and Ff2 are equal. That is to say, in the two sides of the focus coil 3 that are parallel to the Y axis, the X axis minus side and the X axis plus side cancel the torque around the Y axis each other. Hence, no torque is produced around the Y axis in the entire focus coil 3.

Next, the case in which the center of the magnetic circuit is shifted from the center of the focus coil will be described. If the movable part moves in the X axis plus direction, for example, the center of generation of the driving force Ff0 in the part of the focus coil 3 that is parallel to the X axis, which corresponds to the center of the magnetic circuit, deviates in the X axis minus direction from the center of gravity, G, of the movable part. This causes clockwise torque around the Y axis. On the other hand, the magnetic flux passing through the two sides parallel to the Y axis loses uniformity. Accordingly, a difference is caused between the driving forces Ff1 and Ff2 generated in these two sides in the direction away from the optical disk E. That is to say, the magnetic flux density passing through in the X axis direction increases on the X axis minus side as the ferromagnetic piece 30 gets nearer to the permanent magnet 405 and hence the driving force Ff1 generated there becomes larger than the driving force Ff2 generated on the X axis plus side. This causes counterclockwise torque around the Y axis. As the result, the torque around the Y axis is cancelled each other in the side parallel to the X axis and the two sides parallel to the Y axis in the focus coil 3.

As has been described above, the ninth embodiment enables suppression of the torque around the Y axis with a single permanent magnet 405 on each of the two sides of the focus coil 3 that are parallel to the X axis. This allows the width of the permanent magnet in the X axis direction to be reduced, which in turn reduces the width of the objective lens actuator in the X axis direction. Accordingly, in addition to the effect of the fourth embodiment, it is possible to reduce the width of the optical pickup in the X axis direction, which allows use of a motor having a larger diameter to rotate the optical disk E.

(Tenth Embodiment)

Figure 21:
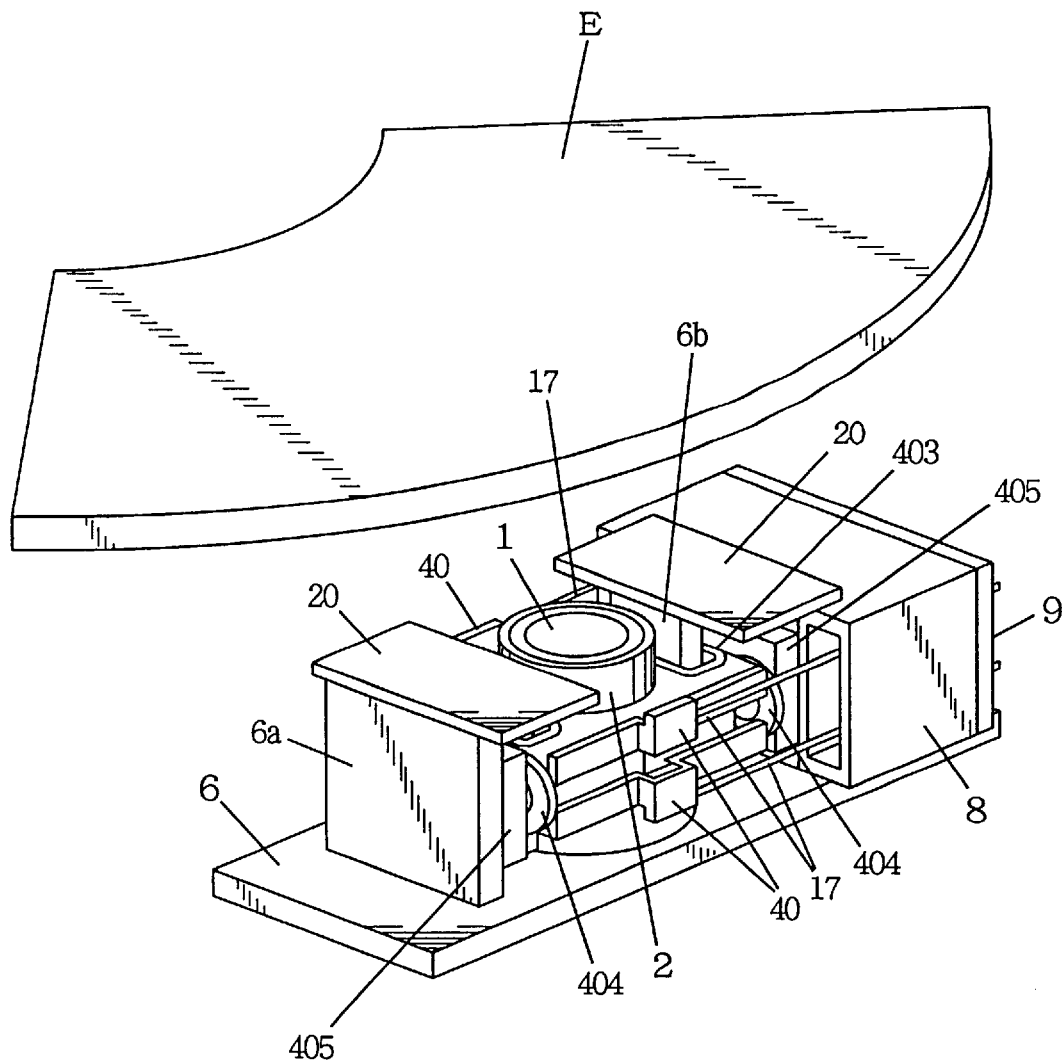
FIG. 21 is a perspective view showing the structure of an objective lens actuator according to a tenth embodiment of the present invention.

FIG. 21 is a perspective view showing the structure of an objective lens actuator according to a tenth embodiment of the present invention. In FIG. 21, the components having the same functions as those in the ninth embodiment depicted in FIG. 19 and FIG. 20 are shown at the same characters and not described in detail again.

In FIG. 21, the lens holder 2 is a resin molded article formed of liquid crystal polymer, PPS, or the like. The focus coils 403, wound around the Z axis direction, or the focus direction, are fixed on the two sides of the lens holder 2 that are parallel to the X axis direction. A pair of tracking coils 404, wound about the Y axis direction, similarly to the tracking coils 104 shown in FIG. 8 and FIG. 9, are fixed on each of the two sides of the lens holder 2 that are parallel to the X axis direction. The ferromagnetic pieces 40 have a spring property and electric conductivity, which are formed of a stainless plate containing iron, for example. The elastic supporting portions 17 are formed integrally with the ferromagnetic pieces 40 by sheet metal press working or the like. The ferromagnetic pieces 40 are formed integrally with the lens holder 2 by insert molding, to which ends of the focus coils 403 and the tracking coils 404 are fixed with solder.

In FIG. 21, the tenth embodiment differs from the ninth embodiment shown in FIG. 19 and FIG. 20 in that the ferromagnetic pieces 40 formed integrally with the elastic supporting portions 17 formed of a material having a spring property and electric conductivity are fixed by insert molding on the two sides of the lens holder 2 that are parallel to the Y axis direction.

In other respects, the operation of the tenth embodiment and its mechanism for suppressing the torque around the Y axis are the same as those in the ninth embodiment and not described again.

As stated above, in the objective lens actuator according to the tenth embodiment, the focus coils 403 wound about the Z axis and the tracking coils 404 wound about the Y axis are fixed on the two side surfaces of the lens holder 2 that are parallel to the X axis direction, and the ferromagnetic pieces 40 formed integrally with the elastic supporting portions 17 formed of a material having a spring property and electric conductivity are united with the lens holder 2 by insert molding on the two side surfaces of the lens holder 2 that are parallel to the Y axis, with the ends of the focus coils 403 and the tracking coils 404 solder-fixed to the ferromagnetic pieces 40. This not only eliminates the necessity of printed boards on the sides of the lens holder 2 but also reduces the number of assembly steps, which provides price reduction, in addition to the effect of the ninth embodiment.

Although the focus coils 403 are fixed to the lens holder 2 in the tenth embodiment, the coil may be wound around the Z axis on the entire side surfaces of the lens holder 2 with the ferromagnetic pieces 40 fixed on the side surfaces of the lens holder 2 that are parallel to the Y axis direction. Needless to say, the tracking coils 404 may be wound about the X axis on the side surfaces of the lens holder 2.

Although the focus coils 403 and the tracking coils 404 are fixed to the lens holder 2 in the tenth embodiment, they may be united with the lens holder 2 by insert molding, similarly to the ferromagnetic pieces 40.

In the embodiments described above, two maximum points are formed in the density distribution of the magnetic flux passing through one side of the focus coil to obtain flat distribution of the flux density. However, it may be constructed so that three or more maximum points are formed in the flux density distribution for one side of the focus coil. In this case, three or more permanent magnets or divided yokes are provided to face a side of the focus coil which is parallel to the X axis or three or more projections are formed on the intermediate yoke.

While the invention has been described in detail, the foregoing description is in all aspects illustrative and not restrictive. It is understood that numerous other modifications and variations can be devised without departing from the scope of the invention.

We claim:

1. An apparatus for driving an objective lens, which collects light onto an information track of an information recording medium, at least in a focus direction perpendicular to the information recording medium, said apparatus comprising:

a lens holder holding the objective lens;

a focus coil being wound or affixed on sides of said lens holder;

a plurality of magnetic flux generating portions disposed to face said focus coil, wherein each of said plurality of magnetic flux generating portions comprise two permanent magnets; and an elastic supporting portion supporting said lens holder so that said lens holder can move at least in the focus direction;

wherein each of said plurality of magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein said two permanent magnets of each of said plurality of magnetic flux generating portions have their magnetic poles directed in a same direction with respect to the opposing side of said focus coil and are spaced apart from each other in a direction parallel to the opposing side of said focus coil; and wherein the length Fp of the opposing side of said focus coil and a mounting pitch P of said two permanent magnets have a relationship given by expression (a):

$$P=Fp \qquad (a).$$

2. An apparatus for driving an objective lens, which collects light onto an information track of an information recording medium, at least in a focus direction perpendicular to the information recording medium, said apparatus comprising:

a lens holder holding the objective lens;

a focus coil being wound or affixed on sides of said lens holder;

a plurality of magnetic flux generating portions disposed to face said focus coil; and an elastic supporting portion supporting said lens holder so that said lens holder can move at least in the focus direction;

wherein each of said plurality of magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil; and wherein each of said plurality of magnetic flux generating portions comprise a plurality of divided yokes disposed to face said focus coil and spaced apart in a direction parallel to the opposing side of said focus coil, and a single permanent magnet disposed to abut sides of said plurality of divided yokes that are opposite to the sides facing said focus coil.

3. An apparatus as claimed in claim 2, wherein said plurality of divided yokes comprise two divided yokes, wherein a width Wc and a provision pitch Pc of said two divided yokes have a relationship given by expression (b):

$$Pc-Wc>0 \qquad (b).$$

4. An apparatus for driving an objective lens, which collects light onto an information track of an information recording medium, at least in a focus direction perpendicular to the information recording medium, said apparatus comprising:

a lens holder holding the objective lens;

a focus coil being wound or affixed on sides of said lens holder;

a plurality of magnetic flux generating portions disposed to face said focus coil; and an elastic supporting portion supporting said lens holder so that said lens holder can move at least in the focus direction;

wherein each of said plurality of magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein each of said plurality of magnetic flux generating portions comprise an intermediate yoke facing said focus coil and having two projections spaced in a direction parallel to the opposing side of said focus coil, a single permanent magnet disposed to abut sides of said intermediate yoke which is opposite to the side facing said focus coil, and a back yoke provided to sandwich said single permanent magnet with said intermediate yoke; and wherein a width Wb and a pitch Pb of said two projections of said intermediate yoke have a relationship given by expression (c):

$$Pb-Wb>0 \qquad (c).$$

5. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generate magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein each of said two magnetic flux generating portions comprise two permanent magnets having their magnetic poles directed in a same direction with respect to the opposing side of said focus coil and being spaced apart in the tracking direction;

wherein said tracking coil comprises a first tracking coil wound or affixed on one side of said lens holder around an axis parallel to the tracking direction, and a second tracking coil wound or affixed on the other side of said lens holder around an axis parallel to the tracking direction; and wherein a mounting pitch Tp in the tracking direction of said first and second tracking coils, a winding width Tw of said first and second tracking coils, a movable range Td in the tracking direction of said lens holder, and a mounting pitch P in the tracking direction of said two permanent magnets, and a width W of said two permanent magnets have a relationship given by expression (d) and/or expression (e):

$$Tp+Tw+Td \leq P+W \qquad (d)$$

$$Tp-Tw-Td \geq P-W \qquad (e).$$

6. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein each of said two magnetic flux generating portions comprise first and second permanent magnets having their magnetic poles directed in a same direction with respect to the opposing side of said focus coil and being spaced apart in the tracking direction;

wherein said tracking coil comprises a first tracking coil wound or affixed on one side of said lens holder in the direction parallel to the information track and a second tracking coil wound or affixed on the other side of said lens holder in the direction parallel to the information track;

wherein each of said first and second tracking coils comprise first and second windings wound into coils around axes in the direction parallel to the information track and connected to each other, and wherein said first and second windings are disposed symmetrically in a lateral direction to face said first and second permanent magnets, respectively; and wherein a mounting pitch Tp between opposing side of said first and second windings whose winding directions have components parallel to the focus direction, a winding width Tw of said first and second windings, a movable range Td in the tracking direction of said lens holder, a mounting pitch P in the tracking direction of said first and second permanent magnets, and a width W of said first and second permanent magnets have a relationship given by expression (f) and/or expression (g):

$$Tp+Tw+Td \leq P+W \qquad (f)$$

$$Tp-Tw-Td \geq P-W \qquad (g).$$

7. An apparatus as claimed in claim 6, wherein said first and second tracking coils are each formed on a printed board affixed on a side of said lens holder.

8. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein each of said two magnetic flux generating portions comprises a plurality of permanent magnets having their magnetic poles directed in a same direction with respect to the opposing side of said focus coil and being spaced apart in the tracking direction;

wherein each of said two magnetic flux generating portions comprise an opposing yoke disposed to face said plurality of permanent magnets with said focus coil interposed therebetween, and a back yoke disposed to abut on sides of said plurality of permanent magnets that are opposite to their sides facing said focus coil;

wherein said plurality of permanent magnets, said opposing yoke, and said back yoke form a magnetic circuit;

wherein each of said two magnetic flux generating portions comprise a cover yoke formed of a ferromagnetic material and disposed in parallel with the information recording medium across an end face of said opposing yoke and said back yoke that are closer to the information recording medium;

wherein said tracking coil comprises a first tracking coil wound or affixed on one side of said lens holder around an axis parallel to the tracking direction and a second tracking coil wound or affixed on the other side of said lens holder around an axis parallel to the tracking direction; and wherein a mounting pitch Tp in the tracking direction of said first and second tracking coils, a winding width Tw of said first and second tracking coils, a movable range Td in the tracking direction of said lens holder, and a width Wy in the tracking direction of said cover yoke have a relationship given by expression (h):

$$Wy \geq Tp+Tw+Td \qquad (h).$$

9. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generate magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil; and wherein each of said two magnetic flux generating portions comprise a plurality of divided yokes facing said focus coil in the direction parallel to the information track and being spaced apart in the tracking direction, and a single permanent magnet disposed to abut on sides of said plurality of divided yokes that are opposite to their sides facing said focus coil.

10. An apparatus as claimed in claim 9, wherein said plurality of divided yokes comprise two divided yokes, and wherein a width Wc and a provision pitch Pc in the tracking direction of said two divided yokes have a relationship given by expression (i):

$$Pc-Wc>0 \qquad (i).$$

11. An apparatus as claimed in claim 10, wherein a mounting pitch Tp in the tracking direction and a winding width Tw of said tracking coil, a movable range Td in the tracking direction of said lens holder, and a width Wc and a provision pitch Pc in the tracking direction of said two divided yokes have a relationship given by expression (j) and/or expression (k):

$$Tp+Tw+Td \leq Pc+Wc \qquad (j)$$

$$Tp-Tw-Td \geq Pc-Wc \qquad (k).$$

12. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generates magnetic flux such that a density distribution of magnetic flux passing through an opposing side of said focus coil has two or more maximum points, and such that an area of the density distribution of the magnetic flux passing through the opposing side of said focus coil is wider than a length of the opposing side of said focus coil;

wherein each of said two magnetic flux generating portions comprise an intermediate yoke facing said focus coil in the direction parallel to the information track and having two projections formed at an interval in the tracking direction, a single permanent magnet disposed to abut on a side of said intermediate yoke that is opposite to the side facing said focus coil, and a back yoke provided to sandwich said permanent magnet with said intermediate yoke in the direction parallel to the information track; and wherein a width Wb and a pitch Pb in the tracking direction of said two projections of said intermediate yoke have a relationship given by expression (m):

$$Pb-Wb>0 \qquad (m).$$

13. An apparatus as claimed in claim 12, wherein a mounting pitch Tp in the tracking direction and a winding width Tw of said tracking coil, a movable range Td in the tracking direction of said lens holder, and a width Wb and a pitch Pb in tracking direction of said two projections of said intermediate yoke have a relationship given by expression (n) and/or (o):

$$Tp+Tw+Td \leq Pb+Wb \qquad (n)$$

$$Tp-Tw-Td \geq Pb-Wb \qquad (o).$$

14. An apparatus for driving an objective lens, which collects light onto an information track of an information recording medium, at least in a focus direction perpendicular to the information recording medium, said apparatus comprising:

a lens holder holding the objective lens;

a focus coil being wound or affixed on sides of said lens holder;

a plurality of magnetic flux generating portions disposed to face said focus coil; and an elastic supporting portion supporting said lens holder so that said lens holder can move at least in the focus direction;

wherein each of said plurality of magnetic flux generating portions generates magnetic flux such that a density distribution of the magnetic flux passing through an opposing side of said focus coil has two or more maximum points, and such that an area of the density distribution of the magnetic flux passing through the opposing side of said focus coil is wider than a length of the opposing side of said focus coil;

wherein each of said plurality of magnetic flux generating portions comprises a plurality of permanent magnets having their magnetic poles directed in a same direction with respect to the opposing side of said focus coil and being spaced apart from each other in a direction parallel to the opposing side of said focus coil;

wherein each of said plurality of magnetic flux generating portions comprise an opposing yoke disposed along a lateral projection of a space existing in between at least two of said plurality of permanent magnets, with said focus coil interposed in between said opposing yoke and the at least two of said plurality of magnets, and a back yoke disposed to abut on sides of said plurality of permanent magnets that are opposite to their sides facing said focus coil; and wherein said plurality of permanent magnets, said opposing yoke, and said back yoke form a magnetic circuit.

15. An apparatus as claimed in claim 14, wherein said plurality of permanent magnets comprise two permanent magnets and said back yoke has a central projection formed in a center to extend in the focus direction for positioning said two permanent magnets.

16. An apparatus as claimed in claim 14, wherein said plurality of permanent magnets comprise two permanent magnets and said back yoke has two outside projections formed at its marginal parts on both sides to extend in the focus direction for positioning said two permanent magnets.

17. An apparatus as claimed in claim 14, wherein each of said plurality of magnetic flux generating portions comprise an intermediate yoke facing said focus coil and having a plurality of projections spaced in the direction parallel to the opposing side of said focus coil, a single permanent magnet disposed to abut on a side of said intermediate yoke which is opposite to the side facing said focus coil, and a back yoke provided to sandwich said single permanent magnet with said intermediate yoke.

18. An apparatus as claimed in claim 14, wherein a ferromagnetic piece is integrally formed on a side of said lens holder which is perpendicular to its side facing said plurality of magnetic flux generating portions.

19. An apparatus for driving an objective lens, which collects light onto an information track of an information recording medium, in a focus direction perpendicular to the information recording medium and in a tracking direction parallel to the information recording medium and perpendicular to the information track, said apparatus comprising:

a lens holder holding the objective lens;

a focus coil being wound or affixed on sides of said lens holder;

a tracking coil wound or affixed on sides of said lens holder;

two magnetic flux generating portions disposed to face said focus coil and said tracking coil in a direction parallel to the information track; and an elastic supporting portion supporting said lens holder so that said lens holder can move in the focus direction and in the tracking direction;

wherein each of said two magnetic flux generating portions generates magnetic flux such that a density distribution of magnetic flux passing through an opposing side of said focus coil has two or more maximum points, and such that an area of the density distribution of the magnetic flux passing through the opposing side of said focus coil is widerthan a length of the opposing side of said focus coil;

wherein each of said two magnetic flux generating portions comprises a plurality of permanent magnets having their magnetic poles directed in a same direction with respect to the opposing side of said focus coil and being spaced apart in the tracking direction;

wherein each of said two magnetic flux generating portions comprise an opposing yoke disposed along a lateral projection of a space existing in between at least two of said plurality of permanent magnets, with said focus coil interposed in between said opposing yoke and the at least two of said plurality of magnets, and a back yoke disposed to abut on sides of said plurality of permanent magnets that are opposite to their side facing said focus coil; and wherein said plurality of permanent magnets, said opposing yoke, and said back yoke form a magnetic circuit.

20. An apparatus as claimed in claim 19, wherein each of said two magnetic flux generating portions comprise a cover yoke formed of a ferromagnetic material and disposed parallel with the information recording medium across an end face of said opposing yoke and said back yoke that are closer to the information recording medium.

21. An apparatus as claimed in claim 19, wherein said plurality of permanent magnets comprise two permanent magnets and said back yoke has a central projection formed in a center to extend in the focus direction for positioned said two permanent magnets.

22. An apparatus as claimed in claim 19, wherein said plurality of permanent magnets comprise two permanent magnets and said back yoke has outside projections formed in its marginal parts on both sides in the tracking direction to extend in the focus direction for positioning said two permanent magnets.

23. An apparatus as claimed in claim 19, wherein each of said plurality of magnetic flux generating portions comprise an intermediate yoke facing said focus coil in a direction parallel to the information track and having a plurality of projections formed at an interval in the tracking direction, a single permanent magnet disposed to abut on a side of said intermediate yoke which is opposite to the side facing said focus coil, and a back yoke provided to sandwich said permanent magnet with said intermediate yoke in the direction parallel to the information track.

24. An apparatus as claimed in claim 19, wherein a ferromagnetic piece is integrally formed on one side in the tracking direction of said lens holder.

25. An apparatus as claimed in claim 24, wherein said ferromagnetic piece comprises a material having electric conductivity, and wherein current is supplied to said focus coil and said tracking coil through said ferromagnetic piece.

26. An apparatus as claimed in claim 25, wherein said elastic supporting portion is integrally formed with said ferromagnetic piece.

* * * * *